United States Patent
Koyatsu et al.

(10) Patent No.: US 8,705,127 B2
(45) Date of Patent: Apr. 22, 2014

(54) IMAGE PROCESSING APPARATUS, IMAGE FORMING APPARATUS, AND COMPUTER READABLE MEDIUM STORING PROGRAM

(75) Inventors: Jun Koyatsu, Kanagawa (JP); Masahiko Kubo, Kanagawa (JP); Hidetoshi Kawashima, Kanagawa (JP); Toshifumi Takahira, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 269 days.

(21) Appl. No.: 13/236,298

(22) Filed: Sep. 19, 2011

(65) Prior Publication Data
US 2012/0229819 A1 Sep. 13, 2012

(30) Foreign Application Priority Data
Mar. 7, 2011 (JP) ................. 2011-049209

(51) Int. Cl.
- *H04N 1/60* (2006.01)
- *G06F 3/12* (2006.01)
- *G03G 15/08* (2006.01)
- *G03G 15/20* (2006.01)

(52) U.S. Cl.
USPC ............... 358/1.9; 358/1.1; 399/53; 399/341

(58) Field of Classification Search
USPC ................. 358/1.9, 1.1; 399/53, 341
See application file for complete search history.

(56) References Cited

U.S. PATENT DOCUMENTS 8,285,187 B2 * 10/2012 Kimura et al. ............... 399/341
8,494,385 B2 * 7/2013 Terao et al. .................. 399/53

FOREIGN PATENT DOCUMENTS

JP 2002-082508 A 3/2002
JP 2002-207334 A 7/2002

* cited by examiner

Primary Examiner — Charlotte M Baker
(74) Attorney, Agent, or Firm — Sughrue Mion, PLLC

(57) ABSTRACT

An image processing apparatus includes a setting unit and a correcting unit. The setting unit sets a gloss level of an image to be formed by forming plural toner images using a transparent toner and plural color toners having different colors and by fixing the plural toner images onto a recording medium in such a manner that the plural toner images are placed on top of one another on the recording medium. The correcting unit corrects image data defining density values per pixel of the toner images formed using the plural color toners of the respective colors so that a total density value that is a sum of a density value per pixel of the toner image formed using the transparent toner and density values per pixel of the toner images formed using the plural color toners of the respective colors may not exceed a predetermined threshold.

14 Claims, 21 Drawing Sheets

FIG. 8A

| $Y_1$ | $M_1$ | $C_1$ | $K_1$ | | $Y_2$ | $M_2$ | $C_2$ | $K_2$ |
|---|---|---|---|---|---|---|---|---|
| 0 | 0 | 0 | 0 | → | 0 | 0 | 0 | 0 |
| 10 | 20 | 20 | 0 | → | 10 | 20 | 20 | 0 |
| 33 | 33 | 33 | 0 | → | 33 | 33 | 33 | 0 |
| 50 | 50 | 50 | 0 | → | 50 | 50 | 50 | 0 |
| 40 | 40 | 40 | 40 | → | 40 | 40 | 40 | 40 |
| 45 | 35 | 70 | 20 | → | 45 | 35 | 70 | 20 |
| 60 | 60 | 60 | 0 | → | 60 | 60 | 60 | 0 |
| 45 | 55 | 65 | 25 | → | 45 | 55 | 65 | 25 |
| 50 | 50 | 50 | 50 | → | 50 | 50 | 50 | 50 |
| 70 | 70 | 70 | 0 | → | 70 | 70 | 70 | 0 |
| 80 | 60 | 70 | 10 | → | 80 | 60 | 70 | 10 |
| 75 | 85 | 65 | 5 | → | 75 | 85 | 65 | 5 |
| 80 | 80 | 80 | 0 | → | 80 | 80 | 80 | 0 |
| 65 | 65 | 65 | 65 | → | 60 | 60 | 60 | 60 |
| 100 | 100 | 100 | 0 | → | 70 | 70 | 70 | 30 |
| 100 | 100 | 100 | 100 | → | 60 | 60 | 60 | 60 |

FIG. 8B

| $Y_1$ | $M_1$ | $C_1$ | $K_1$ | | $Y_2$ | $M_2$ | $C_2$ | $K_2$ |
|---|---|---|---|---|---|---|---|---|
| 0 | 0 | 0 | 0 | → | 0 | 0 | 0 | 0 |
| 10 | 20 | 20 | 0 | → | 10 | 20 | 20 | 0 |
| 33 | 33 | 33 | 0 | → | 33 | 33 | 33 | 0 |
| 50 | 50 | 50 | 0 | → | 50 | 50 | 50 | 0 |
| 40 | 40 | 40 | 40 | → | 40 | 40 | 40 | 40 |
| 45 | 35 | 70 | 20 | → | 45 | 35 | 70 | 20 |
| 60 | 60 | 60 | 0 | → | 60 | 60 | 60 | 0 |
| 45 | 55 | 65 | 25 | → | 45 | 55 | 65 | 25 |
| 50 | 50 | 50 | 50 | → | 50 | 50 | 50 | 50 |
| 70 | 70 | 70 | 0 | → | 70 | 70 | 70 | 0 |
| 80 | 60 | 70 | 10 | → | 80 | 60 | 70 | 10 |
| 75 | 85 | 65 | 5 | → | 70 | 80 | 60 | 10 |
| 80 | 80 | 80 | 0 | → | 70 | 70 | 70 | 10 |
| 65 | 65 | 65 | 65 | → | 55 | 55 | 55 | 55 |
| 100 | 100 | 100 | 0 | → | 60 | 60 | 60 | 40 |
| 100 | 100 | 100 | 100 | → | 55 | 55 | 65 | 55 |

FIG. 8C

| $Y_1$ | $M_1$ | $C_1$ | $K_1$ | | $Y_2$ | $M_2$ | $C_2$ | $K_2$ |
|---|---|---|---|---|---|---|---|---|
| 0 | 0 | 0 | 0 | → | 0 | 0 | 0 | 0 |
| 10 | 20 | 20 | 0 | → | 10 | 20 | 20 | 0 |
| 33 | 33 | 33 | 0 | → | 33 | 33 | 33 | 0 |
| 50 | 50 | 50 | 0 | → | 50 | 50 | 50 | 0 |
| 40 | 40 | 40 | 40 | → | 40 | 40 | 40 | 40 |
| 45 | 35 | 70 | 20 | → | 45 | 35 | 70 | 20 |
| 60 | 60 | 60 | 0 | → | 60 | 60 | 60 | 0 |
| 45 | 55 | 65 | 25 | → | 45 | 55 | 65 | 25 |
| 50 | 50 | 50 | 50 | → | 48 | 48 | 48 | 48 |
| 70 | 70 | 70 | 0 | → | 63 | 63 | 63 | 0 |
| 80 | 60 | 70 | 10 | → | 65 | 45 | 55 | 25 |
| 75 | 85 | 65 | 5 | → | 55 | 65 | 45 | 25 |
| 80 | 80 | 80 | 0 | → | 55 | 55 | 55 | 25 |
| 65 | 65 | 65 | 65 | → | 48 | 48 | 48 | 48 |
| 100 | 100 | 100 | 0 | → | 48 | 48 | 48 | 48 |
| 100 | 100 | 100 | 100 | → | 48 | 48 | 48 | 48 |

FIG. 8D

| $Y_1$ | $M_1$ | $C_1$ | $K_1$ | | $Y_2$ | $M_2$ | $C_2$ | $K_2$ |
|---|---|---|---|---|---|---|---|---|
| 0 | 0 | 0 | 0 | → | 0 | 0 | 0 | 0 |
| 10 | 20 | 20 | 0 | → | 10 | 20 | 20 | 0 |
| 33 | 33 | 33 | 0 | → | 33 | 33 | 33 | 0 |
| 50 | 50 | 50 | 0 | → | 50 | 50 | 50 | 0 |
| 40 | 40 | 40 | 40 | → | 40 | 40 | 40 | 40 |
| 45 | 35 | 70 | 20 | → | 40 | 30 | 65 | 25 |
| 60 | 60 | 60 | 0 | → | 50 | 50 | 50 | 10 |
| 45 | 55 | 65 | 25 | → | 30 | 40 | 50 | 40 |
| 50 | 50 | 50 | 50 | → | 40 | 40 | 40 | 40 |
| 70 | 70 | 70 | 0 | → | 54 | 54 | 54 | 0 |
| 80 | 60 | 70 | 10 | → | 50 | 30 | 40 | 40 |
| 75 | 85 | 65 | 5 | → | 40 | 50 | 30 | 40 |
| 80 | 80 | 80 | 0 | → | 40 | 40 | 40 | 40 |
| 65 | 65 | 65 | 65 | → | 40 | 40 | 40 | 40 |
| 100 | 100 | 100 | 0 | → | 40 | 40 | 40 | 40 |
| 100 | 100 | 100 | 100 | → | 40 | 40 | 40 | 40 |

FIG. 9A

| Y₂ | M₂ | C₂ | K₂ |
|---|---|---|---|
| 0 | 0 | 0 | 0 |
| 10 | 20 | 20 | 0 |
| 33 | 33 | 33 | 0 |
| 50 | 50 | 50 | 0 |
| 40 | 40 | 40 | 40 |
| 45 | 35 | 70 | 20 |
| 60 | 60 | 60 | 0 |
| 45 | 55 | 65 | 25 |
| 50 | 50 | 50 | 50 |
| 70 | 70 | 70 | 0 |
| 80 | 60 | 70 | 10 |
| 75 | 85 | 65 | 5 |
| 80 | 80 | 80 | 0 |
| 60 | 60 | 60 | 60 |
| 70 | 70 | 70 | 30 |
| 60 | 60 | 60 | 60 |

→

| Y₂ | M₂ | C₂ | K₂ | CT |
|---|---|---|---|---|
| 0 | 0 | 0 | 0 | 0 |
| 10 | 20 | 20 | 0 | 0 |
| 33 | 33 | 33 | 0 | 0 |
| 50 | 50 | 50 | 0 | 0 |
| 40 | 40 | 40 | 40 | 0 |
| 45 | 35 | 70 | 20 | 0 |
| 60 | 60 | 60 | 0 | 0 |
| 45 | 55 | 65 | 25 | 0 |
| 50 | 50 | 50 | 50 | 0 |
| 70 | 70 | 70 | 0 | 0 |
| 80 | 60 | 70 | 10 | 0 |
| 75 | 85 | 65 | 5 | 0 |
| 80 | 80 | 80 | 0 | 0 |
| 60 | 60 | 60 | 60 | 0 |
| 70 | 70 | 70 | 30 | 0 |
| 60 | 60 | 60 | 60 | 0 |

FIG. 9B

| Y₂ | M₂ | C₂ | K₂ |
|---|---|---|---|
| 0 | 0 | 0 | 0 |
| 10 | 20 | 20 | 0 |
| 33 | 33 | 33 | 0 |
| 50 | 50 | 50 | 0 |
| 40 | 40 | 40 | 40 |
| 45 | 35 | 70 | 20 |
| 60 | 60 | 60 | 0 |
| 45 | 55 | 65 | 25 |
| 50 | 50 | 50 | 50 |
| 70 | 70 | 70 | 0 |
| 80 | 60 | 70 | 10 |
| 70 | 80 | 60 | 10 |
| 70 | 70 | 70 | 10 |
| 55 | 55 | 55 | 55 |
| 60 | 60 | 60 | 40 |
| 55 | 55 | 55 | 55 |

→

| Y₂ | M₂ | C₂ | K₂ | CT |
|---|---|---|---|---|
| 0 | 0 | 0 | 0 | 29 |
| 10 | 20 | 20 | 0 | 25 |
| 33 | 33 | 33 | 0 | 21 |
| 50 | 50 | 50 | 0 | 21 |
| 40 | 40 | 40 | 40 | 21 |
| 45 | 35 | 70 | 20 | 21 |
| 60 | 60 | 60 | 0 | 21 |
| 45 | 55 | 65 | 25 | 21 |
| 50 | 50 | 50 | 50 | 21 |
| 70 | 70 | 70 | 0 | 21 |
| 80 | 60 | 70 | 10 | 21 |
| 70 | 80 | 60 | 10 | 21 |
| 70 | 70 | 70 | 10 | 21 |
| 55 | 55 | 55 | 55 | 21 |
| 60 | 60 | 60 | 40 | 21 |
| 55 | 55 | 55 | 55 | 21 |

FIG. 9C

| $Y_2$ | $M_2$ | $C_2$ | $K_2$ |
|---|---|---|---|
| 0 | 0 | 0 | 0 |
| 10 | 20 | 20 | 0 |
| 33 | 33 | 33 | 0 |
| 50 | 50 | 50 | 0 |
| 40 | 40 | 40 | 40 |
| 45 | 35 | 70 | 20 |
| 60 | 60 | 60 | 0 |
| 45 | 55 | 65 | 25 |
| 48 | 48 | 48 | 48 |
| 63 | 63 | 63 | 0 |
| 65 | 45 | 55 | 25 |
| 55 | 65 | 45 | 25 |
| 55 | 55 | 55 | 25 |
| 48 | 48 | 48 | 48 |
| 48 | 48 | 48 | 48 |
| 48 | 48 | 48 | 48 |

→

| $Y_2$ | $M_2$ | $C_2$ | $K_2$ | CT |
|---|---|---|---|---|
| 0 | 0 | 0 | 0 | 55 |
| 10 | 20 | 20 | 0 | 52 |
| 33 | 33 | 33 | 0 | 50 |
| 50 | 50 | 50 | 0 | 50 |
| 40 | 40 | 40 | 40 | 50 |
| 45 | 35 | 70 | 20 | 50 |
| 60 | 60 | 60 | 0 | 50 |
| 45 | 55 | 65 | 25 | 50 |
| 48 | 48 | 48 | 48 | 50 |
| 63 | 63 | 63 | 0 | 50 |
| 65 | 45 | 55 | 25 | 50 |
| 55 | 65 | 45 | 25 | 50 |
| 55 | 55 | 55 | 25 | 50 |
| 48 | 48 | 48 | 48 | 50 |
| 48 | 48 | 48 | 48 | 50 |
| 48 | 48 | 48 | 48 | 50 |

FIG. 9D

| $Y_2$ | $M_2$ | $C_2$ | $K_2$ |
|---|---|---|---|
| 0 | 0 | 0 | 0 |
| 10 | 20 | 20 | 0 |
| 33 | 33 | 33 | 0 |
| 50 | 50 | 50 | 0 |
| 40 | 40 | 40 | 40 |
| 40 | 30 | 65 | 25 |
| 50 | 50 | 50 | 10 |
| 30 | 40 | 50 | 40 |
| 40 | 40 | 40 | 40 |
| 54 | 54 | 54 | 0 |
| 50 | 30 | 40 | 40 |
| 40 | 50 | 30 | 40 |
| 40 | 40 | 40 | 40 |
| 40 | 40 | 40 | 40 |
| 40 | 40 | 40 | 40 |
| 40 | 40 | 40 | 40 |

→

| $Y_2$ | $M_2$ | $C_2$ | $K_2$ | CT |
|---|---|---|---|---|
| 0 | 0 | 0 | 0 | 81 |
| 10 | 20 | 20 | 0 | 80 |
| 33 | 33 | 33 | 0 | 79 |
| 50 | 50 | 50 | 0 | 79 |
| 40 | 40 | 40 | 40 | 79 |
| 40 | 30 | 65 | 25 | 79 |
| 50 | 50 | 50 | 10 | 79 |
| 30 | 40 | 50 | 40 | 79 |
| 40 | 40 | 40 | 40 | 79 |
| 54 | 54 | 54 | 0 | 79 |
| 50 | 30 | 40 | 40 | 79 |
| 40 | 50 | 30 | 40 | 79 |
| 40 | 40 | 40 | 40 | 79 |
| 40 | 40 | 40 | 40 | 79 |
| 40 | 40 | 40 | 40 | 79 |
| 40 | 40 | 40 | 40 | 79 |

FIG. 10A

| $Y_1$ | $M_1$ | $C_1$ | $K_1$ | TOTAL AMOUNT | | $Y_3$ | $M_3$ | $C_3$ | $K_3$ | CT | TOTAL AMOUNT |
|---|---|---|---|---|---|---|---|---|---|---|---|
| 0 | 0 | 0 | 0 | 0 [%] | → | 0 | 0 | 0 | 0 | 0 | 0 [%] |
| 10 | 20 | 20 | 0 | 50 [%] | → | 10 | 20 | 20 | 0 | 0 | 50 [%] |
| 33 | 33 | 33 | 0 | 100 [%] | → | 33 | 33 | 33 | 0 | 0 | 100 [%] |
| 50 | 50 | 50 | 0 | 150 [%] | → | 50 | 50 | 50 | 0 | 0 | 150 [%] |
| 40 | 40 | 40 | 40 | 160 [%] | → | 40 | 40 | 40 | 40 | 0 | 160 [%] |
| 45 | 35 | 70 | 20 | 170 [%] | → | 45 | 35 | 70 | 20 | 0 | 170 [%] |
| 60 | 60 | 60 | 0 | 180 [%] | → | 60 | 60 | 60 | 0 | 0 | 180 [%] |
| 45 | 55 | 65 | 25 | 190 [%] | → | 45 | 55 | 65 | 25 | 0 | 190 [%] |
| 50 | 50 | 50 | 50 | 200 [%] | → | 50 | 50 | 50 | 50 | 0 | 200 [%] |
| 70 | 70 | 70 | 0 | 210 [%] | → | 70 | 70 | 70 | 0 | 0 | 210 [%] |
| 80 | 60 | 70 | 10 | 220 [%] | → | 80 | 60 | 70 | 10 | 0 | 220 [%] |
| 75 | 85 | 65 | 5 | 230 [%] | → | 75 | 85 | 65 | 5 | 0 | 230 [%] |
| 80 | 80 | 80 | 0 | 240 [%] | → | 80 | 80 | 80 | 0 | 0 | 240 [%] |
| 65 | 65 | 65 | 65 | 260 [%] | → | 60 | 60 | 60 | 60 | 0 | 240 [%] |
| 100 | 100 | 100 | 0 | 300 [%] | → | 70 | 70 | 70 | 30 | 0 | 240 [%] |
| 100 | 100 | 100 | 100 | 400 [%] | → | 60 | 60 | 60 | 60 | 0 | 240 [%] |

FIG. 10B

| $Y_1$ | $M_1$ | $C_1$ | $K_1$ | TOTAL AMOUNT | | $Y_1$ | $M_1$ | $C_1$ | $K_1$ | CT | TOTAL AMOUNT |
|---|---|---|---|---|---|---|---|---|---|---|---|
| 0 | 0 | 0 | 0 | 0 [%] | → | 0 | 0 | 0 | 0 | 29 | 29 [%] |
| 10 | 20 | 20 | 0 | 50 [%] | → | 10 | 20 | 20 | 0 | 25 | 75 [%] |
| 33 | 33 | 33 | 0 | 100 [%] | → | 33 | 33 | 33 | 0 | 21 | 121 [%] |
| 50 | 50 | 50 | 0 | 150 [%] | → | 50 | 50 | 50 | 0 | 21 | 171 [%] |
| 40 | 40 | 40 | 40 | 160 [%] | → | 40 | 40 | 40 | 40 | 21 | 181 [%] |
| 45 | 35 | 70 | 20 | 170 [%] | → | 45 | 35 | 70 | 20 | 21 | 191 [%] |
| 60 | 60 | 60 | 0 | 180 [%] | → | 60 | 60 | 60 | 0 | 21 | 201 [%] |
| 45 | 55 | 65 | 25 | 190 [%] | → | 45 | 55 | 65 | 25 | 21 | 211 [%] |
| 50 | 50 | 50 | 50 | 200 [%] | → | 50 | 50 | 50 | 50 | 21 | 221 [%] |
| 70 | 70 | 70 | 0 | 210 [%] | → | 70 | 70 | 70 | 0 | 21 | 231 [%] |
| 80 | 60 | 70 | 10 | 220 [%] | → | 80 | 60 | 70 | 10 | 21 | 240 [%] |
| 75 | 85 | 65 | 5 | 230 [%] | → | 70 | 80 | 60 | 10 | 21 | 240 [%] |
| 80 | 80 | 80 | 0 | 240 [%] | → | 70 | 70 | 70 | 10 | 21 | 240 [%] |
| 65 | 65 | 65 | 65 | 260 [%] | → | 55 | 55 | 55 | 55 | 21 | 240 [%] |
| 100 | 100 | 100 | 0 | 300 [%] | → | 60 | 60 | 60 | 40 | 21 | 240 [%] |
| 100 | 100 | 100 | 100 | 400 [%] | → | 55 | 55 | 55 | 55 | 21 | 240 [%] |

FIG. 11A

| $Y_1$ | $M_1$ | $C_1$ | $K_1$ | TOTAL AMOUNT |
|---|---|---|---|---|
| 0 | 0 | 0 | 0 | 0 [%] |
| 10 | 20 | 20 | 0 | 50 [%] |
| 33 | 33 | 33 | 0 | 100 [%] |
| 50 | 50 | 50 | 0 | 150 [%] |
| 40 | 40 | 40 | 40 | 160 [%] |
| 45 | 35 | 70 | 20 | 170 [%] |
| 60 | 60 | 60 | 0 | 180 [%] |
| 45 | 55 | 65 | 25 | 190 [%] |
| 50 | 50 | 50 | 50 | 200 [%] |
| 70 | 70 | 70 | 0 | 210 [%] |
| 80 | 60 | 70 | 10 | 220 [%] |
| 75 | 85 | 65 | 5 | 230 [%] |
| 80 | 80 | 80 | 0 | 240 [%] |
| 65 | 65 | 65 | 65 | 260 [%] |
| 100 | 100 | 100 | 0 | 300 [%] |
| 100 | 100 | 100 | 100 | 400 [%] |

→

| $Y_3$ | $M_3$ | $C_3$ | $K_3$ | CT | TOTAL AMOUNT |
|---|---|---|---|---|---|
| 0 | 0 | 0 | 0 | 55 | 55 [%] |
| 10 | 20 | 20 | 0 | 52 | 102 [%] |
| 33 | 33 | 33 | 0 | 50 | 150 [%] |
| 50 | 50 | 50 | 0 | 50 | 200 [%] |
| 40 | 40 | 40 | 40 | 50 | 210 [%] |
| 45 | 35 | 70 | 20 | 50 | 220 [%] |
| 60 | 60 | 60 | 0 | 50 | 230 [%] |
| 45 | 55 | 65 | 25 | 50 | 240 [%] |
| 48 | 48 | 48 | 48 | 50 | 240 [%] |
| 63 | 63 | 63 | 0 | 50 | 240 [%] |
| 65 | 45 | 55 | 25 | 50 | 240 [%] |
| 55 | 65 | 45 | 25 | 50 | 240 [%] |
| 55 | 55 | 55 | 25 | 50 | 240 [%] |
| 48 | 48 | 48 | 48 | 50 | 240 [%] |
| 48 | 48 | 48 | 48 | 50 | 240 [%] |
| 48 | 48 | 48 | 48 | 50 | 240 [%] |

FIG. 11B

| $Y_1$ | $M_1$ | $C_1$ | $K_1$ | TOTAL AMOUNT |
|---|---|---|---|---|
| 0 | 0 | 0 | 0 | 0 [%] |
| 10 | 20 | 20 | 0 | 50 [%] |
| 33 | 33 | 33 | 0 | 100 [%] |
| 50 | 50 | 50 | 0 | 150 [%] |
| 40 | 40 | 40 | 40 | 160 [%] |
| 45 | 35 | 70 | 20 | 170 [%] |
| 60 | 60 | 60 | 0 | 180 [%] |
| 45 | 55 | 65 | 25 | 190 [%] |
| 50 | 50 | 50 | 50 | 200 [%] |
| 70 | 70 | 70 | 0 | 210 [%] |
| 80 | 60 | 70 | 10 | 220 [%] |
| 75 | 85 | 65 | 5 | 230 [%] |
| 80 | 80 | 80 | 0 | 240 [%] |
| 65 | 65 | 65 | 65 | 260 [%] |
| 100 | 100 | 100 | 0 | 300 [%] |
| 100 | 100 | 100 | 100 | 400 [%] |

→

| $Y_3$ | $M_3$ | $C_3$ | $K_3$ | CT | TOTAL AMOUNT |
|---|---|---|---|---|---|
| 0 | 0 | 0 | 0 | 81 | 81 [%] |
| 10 | 20 | 20 | 0 | 80 | 130 [%] |
| 33 | 33 | 33 | 0 | 79 | 179 [%] |
| 50 | 50 | 50 | 0 | 79 | 229 [%] |
| 40 | 40 | 40 | 40 | 79 | 240 [%] |
| 40 | 30 | 65 | 25 | 79 | 240 [%] |
| 50 | 50 | 50 | 10 | 79 | 240 [%] |
| 30 | 40 | 50 | 40 | 79 | 240 [%] |
| 40 | 40 | 40 | 40 | 79 | 240 [%] |
| 54 | 54 | 54 | 0 | 79 | 240 [%] |
| 50 | 30 | 40 | 40 | 79 | 240 [%] |
| 40 | 50 | 30 | 40 | 79 | 240 [%] |
| 40 | 40 | 40 | 40 | 79 | 240 [%] |
| 40 | 40 | 40 | 40 | 79 | 240 [%] |
| 40 | 40 | 40 | 40 | 79 | 240 [%] |
| 40 | 40 | 40 | 40 | 79 | 240 [%] |

FIG. 17A

| \_ | INPUT | | | | | | \_ | OUTPUT | | | | | |
|---|---|---|---|---|---|---|---|---|---|---|---|---|---|
| Y [%] | M [%] | C [%] | K [%] | GLOSSINESS MODE | TOTAL AMOUNT | | | Y' [%] | M' [%] | C' [%] | K' [%] | CT [%] | TOTAL AMOUNT |
| 0 | 0 | 0 | 0 | 0 | 0 [%] | → | | 0 | 0 | 0 | 0 | 0 | 0 [%] |
| 0 | 0 | 0 | 0 | 1 | 0 [%] | → | | 0 | 0 | 0 | 0 | 29 | 29 [%] |
| 0 | 0 | 0 | 0 | 2 | 0 [%] | → | | 0 | 0 | 0 | 0 | 55 | 55 [%] |
| 0 | 0 | 0 | 0 | 3 | 0 [%] | → | | 0 | 0 | 0 | 0 | 81 | 81 [%] |
| 10 | 20 | 20 | 0 | 0 | 50 [%] | → | | 10 | 20 | 20 | 0 | 0 | 50 [%] |
| 10 | 20 | 20 | 0 | 1 | 50 [%] | → | | 10 | 20 | 20 | 0 | 25 | 75 [%] |
| 10 | 20 | 20 | 0 | 2 | 50 [%] | → | | 10 | 20 | 20 | 0 | 52 | 102 [%] |
| 10 | 20 | 20 | 0 | 3 | 50 [%] | → | | 10 | 20 | 20 | 0 | 80 | 130 [%] |
| 33 | 33 | 33 | 0 | 0 | 100 [%] | → | | 33 | 33 | 33 | 0 | 0 | 100 [%] |
| 33 | 33 | 33 | 0 | 1 | 100 [%] | → | | 33 | 33 | 33 | 0 | 21 | 121 [%] |
| 33 | 33 | 33 | 0 | 2 | 100 [%] | → | | 33 | 33 | 33 | 0 | 50 | 150 [%] |
| 33 | 33 | 33 | 0 | 3 | 100 [%] | → | | 33 | 33 | 33 | 0 | 79 | 179 [%] |
| 50 | 50 | 50 | 0 | 0 | 150 [%] | → | | 50 | 50 | 50 | 0 | 0 | 150 [%] |
| 50 | 50 | 50 | 0 | 1 | 150 [%] | → | | 50 | 50 | 50 | 0 | 21 | 171 [%] |
| 50 | 50 | 50 | 0 | 2 | 150 [%] | → | | 50 | 50 | 50 | 0 | 50 | 200 [%] |
| 50 | 50 | 50 | 0 | 3 | 150 [%] | → | | 50 | 50 | 50 | 0 | 79 | 229 [%] |
| 40 | 40 | 40 | 40 | 0 | 160 [%] | → | | 40 | 40 | 40 | 40 | 0 | 160 [%] |
| 40 | 40 | 40 | 40 | 1 | 160 [%] | → | | 40 | 40 | 40 | 40 | 21 | 181 [%] |
| 40 | 40 | 40 | 40 | 2 | 160 [%] | → | | 40 | 40 | 40 | 40 | 50 | 210 [%] |
| 40 | 40 | 40 | 40 | 3 | 160 [%] | → | | 40 | 40 | 40 | 40 | 79 | 240 [%] |
| 45 | 35 | 70 | 20 | 0 | 170 [%] | → | | 45 | 35 | 70 | 20 | 0 | 170 [%] |
| 45 | 35 | 70 | 20 | 1 | 170 [%] | → | | 45 | 35 | 70 | 20 | 21 | 191 [%] |
| 45 | 35 | 70 | 20 | 2 | 170 [%] | → | | 45 | 35 | 70 | 20 | 50 | 220 [%] |
| 45 | 35 | 70 | 20 | 3 | 170 [%] | → | | 40 | 30 | 65 | 25 | 79 | 240 [%] |
| 60 | 60 | 60 | 0 | 0 | 180 [%] | → | | 60 | 60 | 60 | 0 | 0 | 180 [%] |
| 60 | 60 | 60 | 0 | 1 | 180 [%] | → | | 60 | 60 | 60 | 0 | 21 | 201 [%] |
| 60 | 60 | 60 | 0 | 2 | 180 [%] | → | | 60 | 60 | 60 | 0 | 50 | 230 [%] |
| 60 | 60 | 60 | 0 | 3 | 180 [%] | → | | 50 | 50 | 50 | 10 | 79 | 240 [%] |
| 45 | 55 | 65 | 25 | 0 | 190 [%] | → | | 45 | 55 | 65 | 25 | 0 | 190 [%] |
| 45 | 55 | 65 | 25 | 1 | 190 [%] | → | | 45 | 55 | 65 | 25 | 21 | 211 [%] |
| 45 | 55 | 65 | 25 | 2 | 190 [%] | → | | 45 | 55 | 65 | 25 | 50 | 240 [%] |
| 45 | 55 | 65 | 25 | 3 | 190 [%] | → | | 30 | 40 | 50 | 40 | 79 | 240 [%] |

FIG. 17B

| INPUT | | | | | | | OUTPUT | | | | | |
|---|---|---|---|---|---|---|---|---|---|---|---|---|
| Y [%] | M [%] | C [%] | K [%] | GLOSSINESS MODE | TOTAL AMOUNT | | Y' [%] | M' [%] | C' [%] | K' [%] | CT [%] | TOTAL AMOUNT |
| 50 | 50 | 50 | 50 | 0 | 200 [%] | → | 50 | 50 | 50 | 50 | 0 | 200 [%] |
| 50 | 50 | 50 | 50 | 1 | 200 [%] | → | 50 | 50 | 50 | 50 | 21 | 221 [%] |
| 50 | 50 | 50 | 50 | 2 | 200 [%] | → | 48 | 48 | 48 | 48 | 50 | 240 [%] |
| 50 | 50 | 50 | 50 | 3 | 200 [%] | → | 40 | 40 | 40 | 40 | 79 | 240 [%] |
| ⋮ | | | | | | | ⋮ | | | | | |
| 70 | 70 | 70 | 70 | 0 | 210 [%] | → | 70 | 70 | 70 | 0 | 0 | 210 [%] |
| 70 | 70 | 70 | 70 | 1 | 210 [%] | → | 70 | 70 | 70 | 0 | 21 | 231 [%] |
| 70 | 70 | 70 | 70 | 2 | 210 [%] | → | 63 | 63 | 63 | 0 | 50 | 240 [%] |
| 70 | 70 | 70 | 70 | 3 | 210 [%] | → | 54 | 54 | 54 | 0 | 79 | 240 [%] |
| ⋮ | | | | | | | ⋮ | | | | | |
| 80 | 60 | 70 | 10 | 0 | 220 [%] | → | 80 | 60 | 70 | 10 | 0 | 220 [%] |
| 80 | 60 | 70 | 10 | 1 | 220 [%] | → | 80 | 60 | 70 | 10 | 21 | 240 [%] |
| 80 | 60 | 70 | 10 | 2 | 220 [%] | → | 85 | 45 | 55 | 25 | 50 | 240 [%] |
| 80 | 60 | 70 | 10 | 3 | 220 [%] | → | 50 | 30 | 40 | 40 | 79 | 240 [%] |
| ⋮ | | | | | | | ⋮ | | | | | |
| 75 | 85 | 65 | 5 | 0 | 230 [%] | → | 75 | 85 | 65 | 5 | 0 | 230 [%] |
| 75 | 85 | 65 | 5 | 1 | 230 [%] | → | 70 | 80 | 60 | 10 | 21 | 240 [%] |
| 75 | 85 | 65 | 5 | 2 | 230 [%] | → | 55 | 65 | 45 | 25 | 50 | 240 [%] |
| 75 | 85 | 65 | 5 | 3 | 230 [%] | → | 40 | 50 | 30 | 40 | 79 | 240 [%] |
| ⋮ | | | | | | | ⋮ | | | | | |
| 80 | 80 | 80 | 0 | 0 | 240 [%] | → | 80 | 80 | 80 | 0 | 0 | 240 [%] |
| 80 | 80 | 80 | 0 | 1 | 240 [%] | → | 70 | 70 | 70 | 10 | 21 | 240 [%] |
| 80 | 80 | 80 | 0 | 2 | 240 [%] | → | 55 | 55 | 55 | 25 | 50 | 240 [%] |
| 80 | 80 | 80 | 0 | 3 | 240 [%] | → | 40 | 40 | 40 | 40 | 79 | 240 [%] |
| ⋮ | | | | | | | ⋮ | | | | | |
| 65 | 65 | 65 | 65 | 0 | 260 [%] | → | 60 | 60 | 60 | 60 | 0 | 240 [%] |
| 65 | 65 | 65 | 65 | 1 | 260 [%] | → | 55 | 55 | 55 | 55 | 21 | 240 [%] |
| 65 | 65 | 65 | 65 | 2 | 260 [%] | → | 48 | 48 | 48 | 48 | 50 | 240 [%] |
| 65 | 65 | 65 | 65 | 3 | 260 [%] | → | 40 | 40 | 40 | 40 | 79 | 240 [%] |
| ⋮ | | | | | | | ⋮ | | | | | |
| 100 | 100 | 100 | 0 | 0 | 300 [%] | → | 70 | 70 | 70 | 30 | 0 | 240 [%] |
| 100 | 100 | 100 | 0 | 1 | 300 [%] | → | 60 | 60 | 60 | 40 | 21 | 240 [%] |
| 100 | 100 | 100 | 0 | 2 | 300 [%] | → | 48 | 48 | 48 | 48 | 50 | 240 [%] |
| 100 | 100 | 100 | 0 | 3 | 300 [%] | → | 40 | 40 | 40 | 40 | 79 | 240 [%] |
| ⋮ | | | | | | | ⋮ | | | | | |
| 100 | 100 | 100 | 100 | 0 | 400 [%] | → | 60 | 60 | 60 | 60 | 0 | 240 [%] |
| 100 | 100 | 100 | 100 | 1 | 400 [%] | → | 55 | 55 | 55 | 55 | 21 | 240 [%] |
| 100 | 100 | 100 | 100 | 2 | 400 [%] | → | 48 | 48 | 48 | 48 | 50 | 240 [%] |
| 100 | 100 | 100 | 100 | 3 | 400 [%] | → | 40 | 40 | 40 | 40 | 79 | 240 [%] |

IMAGE PROCESSING APPARATUS, IMAGE FORMING APPARATUS, AND COMPUTER READABLE MEDIUM STORING PROGRAM

CROSS-REFERENCE TO RELATED APPLICATIONS

This application is based on and claims priority under 35 USC 119 from Japanese Patent Application No. 2011-049209 filed Mar. 7, 2011.

BACKGROUND (i) Technical Field

The present invention relates to an image processing apparatus, an image forming apparatus, and a computer readable medium storing a program.

SUMMARY

According to an aspect of the invention, there is provided an image processing apparatus including a setting unit and a correcting unit. The setting unit sets a gloss level of an image to be formed by forming plural toner images using a transparent toner and plural color toners having different colors and by fixing the plural toner images onto a recording medium in such a manner that the plural toner images are placed on top of one another on the recording medium. The plural color toners give a first gloss level after the plural toner images have been fixed. The transparent toner become transparent and gives a second gloss level different from the first gloss level after the plural toner images have been fixed. The correcting unit corrects image data defining density values per pixel of the toner images formed using the plural color toners of the respective colors so that a total density value that is a sum of a density value per pixel of the toner image formed using the transparent toner, which is necessary to set the gloss level of the image to be formed to the set gloss level, and density values per pixel of the toner images formed using the plural color toners of the respective colors may not exceed a predetermined threshold.

BRIEF DESCRIPTION OF THE DRAWINGS

Exemplary embodiment(s) of the present invention will be described in detail based on the following figures, wherein:

FIGS. 8A to 8D illustrate a specific example of four color conversion tables held in a first table holding unit;

FIGS. 9A to 9D illustrate a specific example of four CT amount tables held in a second table holding unit;

FIG. 10A illustrates an example of multi-level pixel data generated when the gloss level is the "no transparent toner" level, and FIG. 10B illustrates an example of multi-level pixel data generated when the gloss level is the "low gloss" level;

FIG. 11A illustrates an example of multi-level pixel data generated when the gloss level is the "middle gloss" level, and FIG. 11B illustrates an example of multi-level pixel data generated when the gloss level is the "high gloss" level;

FIGS. 17A and 17B illustrate a specific example of color conversion tables set in a color conversion processing unit;

DETAILED DESCRIPTION

An exemplary embodiment will be described in detail hereinafter with reference to the drawings.

Figure 1:
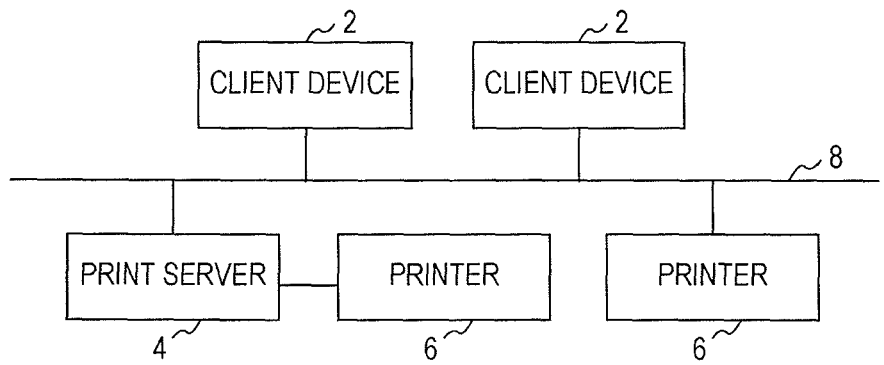
FIG. 1 illustrates plural client devices and a print server which are connected to each other via a communication medium.

In this exemplary embodiment, as illustrated in FIG. 1, plural client devices 2 and a print server 4 are connected to each other via a communication medium 8. The communication medium 8 may be a public line or may be a network such as the Internet, a local area network (LAN), or a wide area network (WAN). The communication medium 8 may also be a wireless communication medium or a wired communication medium. A printer 6 is connected to the print server 4 with or without using the communication medium 8.

Each of the client devices 2 generates image forming information to allow the printer 6 to form an image, and transmits the image forming information to the print server 4. The image forming information may be written in, for example, a page description language, and includes image information representing an image to be formed.

The print server 4 analyzes image forming information received from one of the client devices 2, and generates multi-level image data for each image forming material (hereinafter referred to as "toner") in accordance with the image forming information. The multi-level image data for each toner represents density values corresponding to the amount of toner, on a pixel-by-pixel basis, which is used in the printer 6 to form an image. Then, the print server 4 binarizes the multi-level image data to obtain binary image data, and outputs the binary image data to the printer 6.

The printer 6 forms an image using toner in accordance with the image data output from the print server 4.

Figure 2:
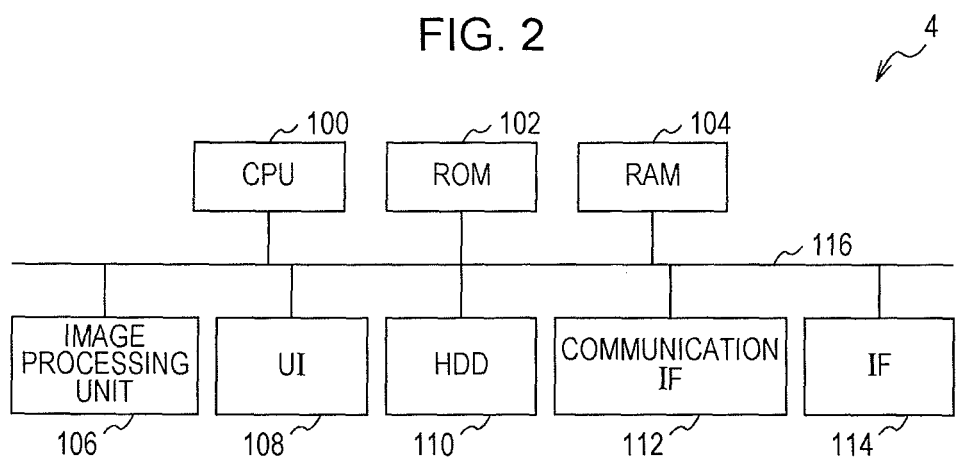
FIG. 2 illustrates an example of the configuration of a print server and a client device.

FIG. 2 illustrates an example of the configuration of the print server 4.

The print server 4 according to this exemplary embodiment includes a central processing unit (CPU) 100, a read only memory (ROM) 102, a random access memory (RAM) 104, an image processing unit 106, a user interface (UI) 108, a hard disk drive (HDD) 110, a communication interface (IF) 112, and an interface (IF) 114, which are connected to one another via a bus 116.

The CPU 100 executes a program stored in the ROM 102 or the HDD 110 to control the overall operation of the print server 4. The ROM 102 stores the program to be executed by the CPU 100, data necessary for the processes of the CPU 100, and any other appropriate data. The RAM 104 may be used as a work memory. The RAM 104 has an area serving as an image memory configured to store image data and the like for each toner, which has been generated by image processing operations such as rasterization and color conversion. Rasterization is a process for generating multi-level bitmap image data (raster data) from image forming information.

The HDD 110 stores the program to be executed by the CPU 100, and various kinds of data.

The storage media for storing the program to be executed by the CPU 100 are not limited to the HDD 110 and the ROM 102. Other storage media such as a flexible disk, a digital versatile disk (DVD), a magneto-optical disk, and a universal serial bus (USB) memory (not illustrated) may be used, or a memory of another device connected to the communication medium 8 may be used.

The image processing unit 106 executes various image processing operations such as rasterization and color conversion in accordance with image forming information received from a client device 2 to generate image data corresponding to each toner. The image processing unit 106 may be, for example, an application specific integrated circuit (ASIC), a field-programmable gate array (FPGA), or the like. The detailed configuration of the image processing unit 106 will be described below.

The UI 108 may be, for example, a liquid crystal display or the like, and includes a display unit and an operation unit. The display unit displays various images, messages, etc., under control of the CPU 100. The operation unit includes, for example, a keyboard and a mouse, and is operated by a user to specify various kinds of information.

The communication IF 112 may be an interface configured to transmit and receive data to and from another device via the communication medium 8.

The IF 114 may be an interface for providing connection with the printer 6 without using the communication medium 8.

Each of the client devices 2 described above may also have a configuration similar to the print server 4. It is to be noted that the program to be executed by a CPU in each of the client devices 2 includes various application software programs and programs for generating and transmitting the image forming information described above.

Figure 3:
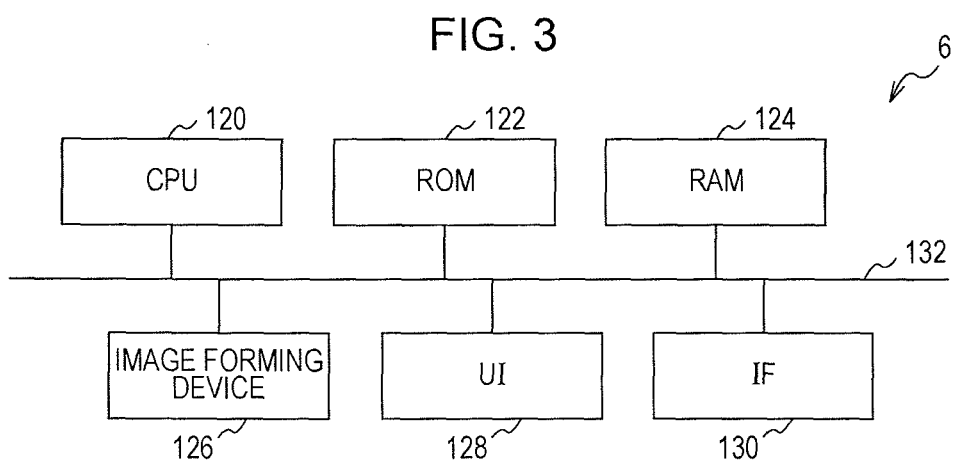
FIG. 3 illustrates an example of the configuration of a printer.

FIG. 3 illustrates an example of the configuration of the printer 6. Here, an example of the configuration of the printer 6 that is connected to the print server 4 without using the communication medium 8 will be described.

The printer 6 includes a CPU 120, a ROM 122, a RAM 124, an image forming device 126, a UI 128, and an IF 130, which are connected to one another via a bus 132.

The CPU 120 executes a program (including, for example, a program for receiving binary image data corresponding to each toner from the print server 4 and controlling the image forming device 126 to form an image in accordance with the received binary image data) stored in the ROM 122 to control the overall operation of the printer 6. The ROM 122 stores the program to be executed by the CPU 120, data necessary for the processes of the CPU 120, and any other appropriate data. The RAM 124 may be used as a work memory.

The storage medium for storing the program to be executed by the CPU 120 is not limited to the ROM 122. Other storage media such as a flexible disk, a DVD, a magneto-optical disk, and a USB memory (not illustrated) may be used.

The image forming device 126 forms an image in accordance with the binary image data received from the print server 4. The configuration of the image forming device 126 will be described below.

The IF 130 may be an interface for providing connection with the print server 4.

The UI 128 includes, for example, a touch panel display configured such that a touch panel is placed over a display, and operation buttons. Various kinds of information may be displayed on the UI 128, and various kinds of information and settings may be input through the UI 128 by the operation of the user.

Although not illustrated in FIG. 3, if the printer 6 is connected directly to the communication medium 8, the printer 6 includes, in addition to the above configuration, a communication IF configured to be connected to the communication medium 8.

Figure 4:
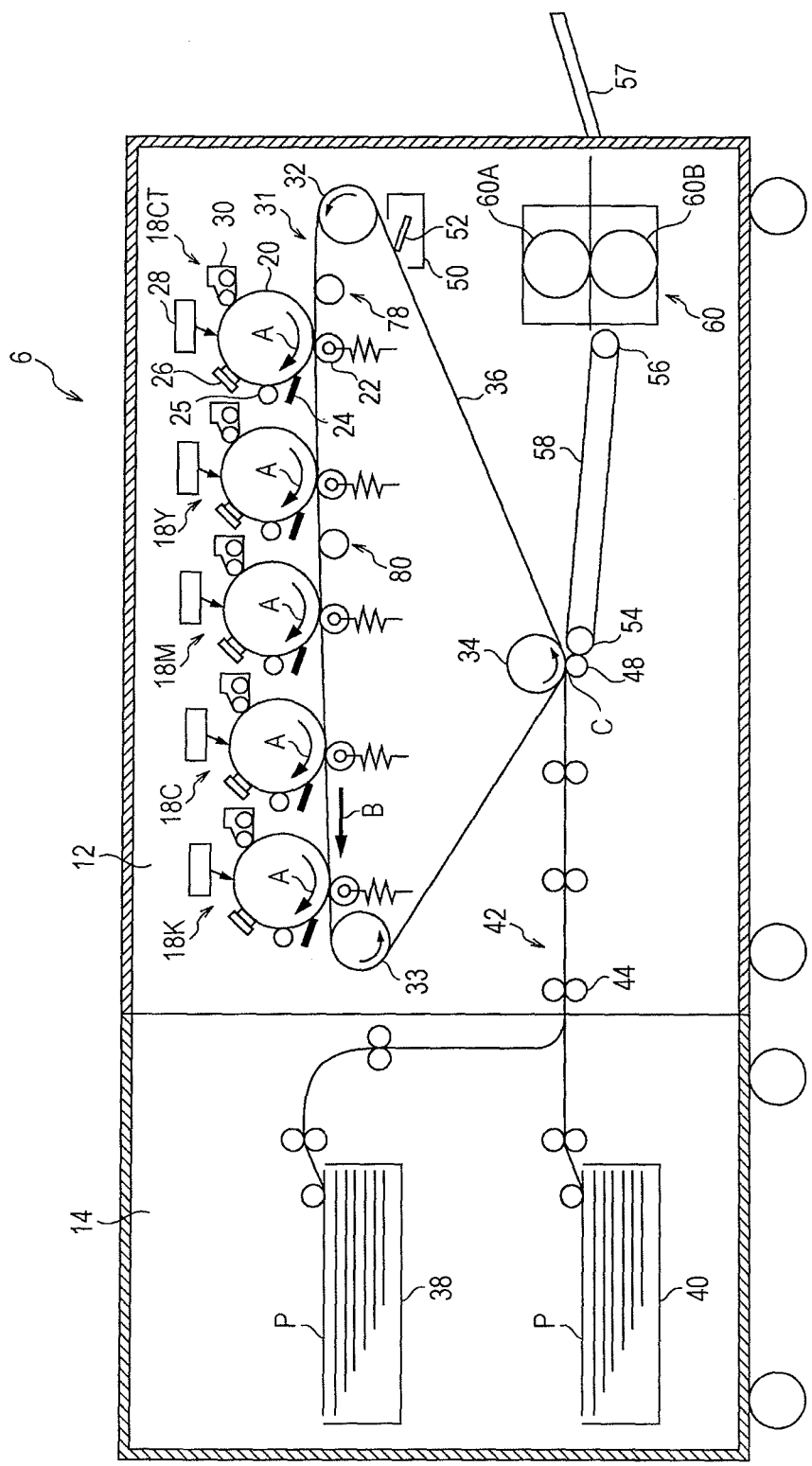
FIG. 4 illustrates a schematic configuration of an image forming device.

FIG. 4 schematically illustrates the configuration of the image forming device 126.

As illustrated in FIG. 4, the image forming device 126 includes an image forming mechanism section 12 configured to form an image on a recording medium (in this exemplary embodiment, a sheet of recording paper P), and a paper feed mechanism section 14 configured to feed a sheet of recording paper P to the image forming mechanism section 12.

The image forming mechanism section 12 includes an image forming unit 18CT and image forming units 18Y, 18M, 18C, and 18K, which are arranged in order from the upstream side in the rotation direction of photoconductors 20 (which is indicated by the arrow A, hereinafter referred to as the "process direction"). The image forming unit 18CT develops an electrostatic latent image formed on a corresponding one of the photoconductors 20 using a high-gloss transparent toner (CT) that becomes transparent after the fixing operation to form a transparent toner image. The image forming units 18Y, 18M, 18C, and 18K develop electrostatic latent images formed on corresponding ones of the photoconductors 20 using toners (color toners) of low-gloss yellow (Y), low-gloss magenta (M), low-gloss cyan C, and low-gloss black (K), respectively, to form color toner images of the respective colors.

A high-gloss toner is a toner that creates an image having a gloss level in a predetermined first range after the image has been fixed, and a low-gloss toner is a toner that creates an image having a gloss level in a second range lower than the first range after the image has been fixed. That is, the terms "high gloss" and "low gloss", as used herein, mean relative representations of one with respect to the other, and are used to distinguish one from the other. High-gloss toners have a lower viscoelasticity than low-gloss toners.

In this exemplary embodiment, the image forming unit 18CT is arranged on the most upstream side in the process direction so that, when a high-gloss transparent toner image is to be formed, the transparent toner image may be superimposed on (or transferred onto) the top layer with respect to the recording surface of the recording paper P. If the high-gloss transparent toner image is formed in the second or lower layer with respect to the recording surface of the recording paper P, a high-gloss effect may not be sufficiently obtained.

In the following description, suffixes CT, Y, M, C, and K are added to numerals to individually identify CT, Y, M, C, and K, respectively, and are not used unless CT, Y, M, C, and K need to be individually identified. In addition, just the term "transport direction" is used to refer to the transport direction of the recording paper P.

The image forming unit 18 includes the photoconductor 20. A first transfer roller 22, a cleaning device 24, a charge erasing device 25, a charger 26, an exposure device 28, and a developing device 30 are disposed around the photoconductor 20 in sequence in the rotation direction of the photoconductor 20.

An intermediate transfer member 31 is disposed below the image forming units 18CT, 18Y, 18M, 18C, and 18K each having the above configuration. The intermediate transfer member 31 includes a support roller 34, support rollers 32 and 33 arranged in the process direction, and an endless intermediate transfer belt 36 stretched over the support rollers 32, 33, and 34.

The image forming units 18CT, 18Y, 18M, 18C, and 18K are arranged in a line in this order in the direction (which is indicated by the arrow B) in which the intermediate transfer belt 36 travels. Under this condition, the first transfer rollers 22CT, 22Y, 22M, 22C, and 22K are located at positions facing the photoconductors 20CT, 20Y, 20M, 20C, and 20K of the image forming units 18CT, 18Y, 18M, 18C, and 18K, respectively, with the intermediate transfer belt 36 therebetween.

With the above configuration, first, the surface of the photoconductor 20 is charged by the charger 26. Then, the surface of the photoconductor 20 is exposed by the exposure device 28 to form an electrostatic latent image on the surface of the photoconductor 20. The electrostatic latent image is developed by the developing device 30 into a toner image. The toner image on the photoconductor 20 is first-transferred onto the intermediate transfer belt 36 by the electrostatic suction force caused by the transfer bias applied to the first transfer roller 22.

After the toner image has been transferred onto the intermediate transfer belt 36, the residual toner which has not been transferred and remains on the photoconductor 20 is removed by the cleaning device 24. The charge on the surface of the photoconductor 20 is erased by the charge erasing device 25. After that, the charger 26 again charges the surface of the photoconductor 20 for the next image forming cycle.

In the printer 6 according to this exemplary embodiment, a color image may be formed by each of the image forming units 18CT, 18Y, 18M, 18C, and 18K performing an image forming process similar to that described above at appropriate timing by taking into account the difference in relative position among the image forming units 18CT, 18Y, 18M, 18C, and 18K. A transparent toner image, a yellow toner image, a magenta toner image, a cyan toner image, and a black toner image are transferred onto the intermediate transfer belt 36 in such a manner that the transparent toner image, the yellow toner image, the magenta toner image, the cyan toner image, and the black toner image are superimposed on top of one another in this order from the bottom of the surface of the intermediate transfer belt 36. Accordingly, a color image is formed.

For example, the printer 6 may form an image only with black by transferring a toner image formed using the image forming unit 18K onto the intermediate transfer belt 36. Accordingly, a white and black image is formed.

The paper feed mechanism section 14 is disposed side-by-side with respect to the image forming mechanism section 12. The paper feed mechanism section 14 includes paper feed cassettes 38 and 40, each of which stores sheets of recording paper P. A sheet of recording paper P is fed to the image forming mechanism section 12 from one of the paper feed cassettes 38 and 40, and is conveyed to a second transfer position C by plural transport rollers 44 in a transport mechanism 42.

The second transfer position C may be a nip position between the support roller 34 that supports the intermediate transfer belt 36 and a second transfer roller 48 that is brought into press contact with the support roller 34. The electrostatic suction force caused by the transfer bias applied to the second transfer roller 48 allows the toner images formed on the intermediate transfer belt 36 to be transferred onto a sheet of recording paper P transported to the second transfer position C.

The residual toner remaining on the intermediate transfer belt 36 is scraped off the intermediate transfer belt 36 by a cleaning blade 52 of an intermediate transfer belt cleaning device 50 disposed in the vicinity of the support roller 32.

A transport belt 58 wrapped around two rollers 54 and 56 is provided downstream from the second transfer position C. The sheet of recording paper P onto which the toner images on the intermediate transfer belt 36 have been transferred is placed on the transport belt 58, and is transported to a fixing device 60 disposed downstream from the transport belt 58.

A fixing process is performed on the toner images using a pressing roller 60A and a heating roller 60B of the fixing device 60 to fix the toner images onto the sheet of recording paper P. That is, an image is formed on the sheet of recording paper P. The sheet of recording paper P having the image formed thereon is output to a paper output tray 57 on the outside of the printer 6.

As illustrated in FIG. 4, a belt retracting member 78 is provided on the side opposite the transfer surface of the intermediate transfer belt 36 between the photoconductor 20CT (the first transfer roller 22CT) and the support roller 32 on the upstream side in the process direction in which the intermediate transfer belt 36 is stretched.

A fixed support member 80 is provided between the photoconductor 20Y (the first transfer roller 22Y) and the photoconductor 20M (the first transfer roller 22M).

The belt retracting member 78 includes a support member that is brought into contact with and separated from the intermediate transfer belt 36, the support member being raised and lowered by a motor (not illustrated). The image forming unit 18CT is also capable of being brought into contact with and separated from the intermediate transfer belt 36. The first transfer roller 22CT provided opposite the photoconductor 20CT of the image forming unit 18CT with the intermediate transfer belt 36 therebetween also has a configuration similar to that of the belt retracting member 78, and is configured to be movable up and down.

Figure 5:
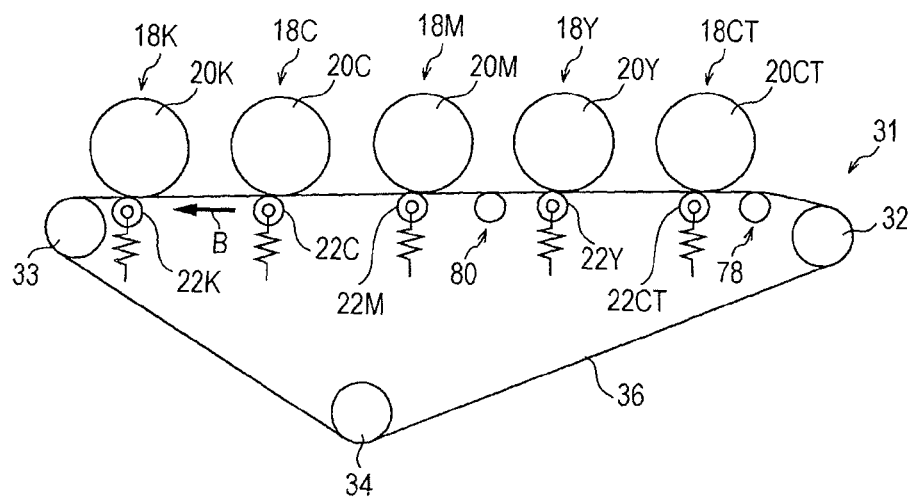
FIG. 5 is a schematic diagram illustrating a position relationship between an intermediate transfer belt and photoconductor drums of respective colors when an image is to be formed using low-gloss four color toners and a high-gloss transparent toner.

With the above configuration, when the support member of the belt retracting member 78 is raised, the support member is brought into contact with the back side of the intermediate transfer belt 36. Thus, as illustrated in FIG. 5, the transfer surface of the intermediate transfer belt 36 is brought into contact with the photoconductors 20K, 20Y, 20M, 20C, and 20CT. The surface opposite the transfer surface of the intermediate transfer belt 36 is also brought into contact with the first transfer rollers 22K, 22Y, 22M, 22C, and 22CT.

Figure 6:
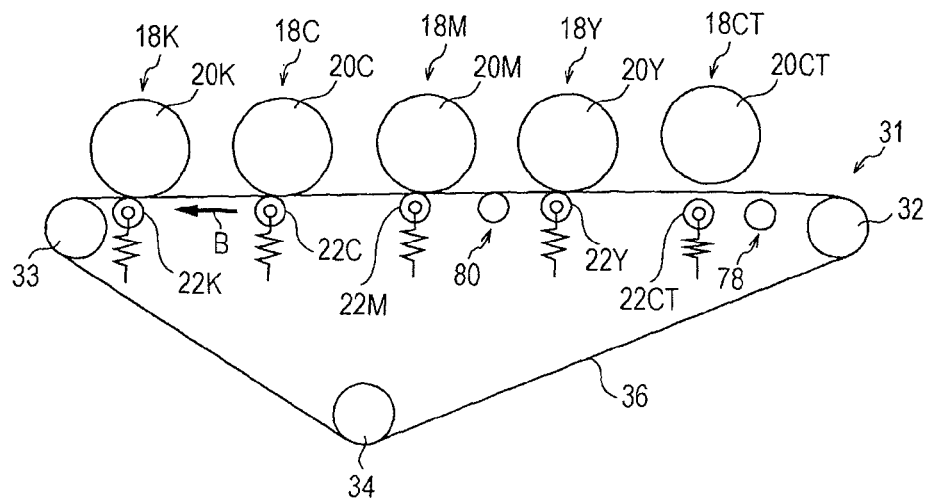
FIG. 6 is a schematic diagram illustrating a positional relationship between the intermediate transfer belt and the photoconductor drums of the respective colors when an image is to be formed in a four-color mode using low-gloss YMCK toners.

When the support member of the belt retracting member 78 is lowered, the transfer surface of the intermediate transfer belt 36 is separated from the photoconductor 20CT. Thus, as illustrated in FIG. 6, the transfer surface of the intermediate transfer belt 36 is brought into contact with the photoconductors 20K, 20Y, 20M, and 20C while moving away from the photoconductor 20CT. Further, the surface opposite the transfer surface of the intermediate transfer belt 36 is brought into contact with the first transfer rollers 22K, 22Y, 22M, and 22C while moving away from the first transfer roller 22CT.

If the photoconductor 20CT is not in contact with the intermediate transfer belt 36, the rotational driving of the photoconductor 20CT is stopped so that the image forming operation of the image forming unit 18CT may not be performed.

When the entire area of the image to be formed is to be formed in a four-color mode using low-gloss YMCK colors, an image is formed in the state illustrated in FIG. 6. When an image is to be formed using a high-gloss transparent toner in addition to low-gloss four color toners, an image is formed in the state illustrated in FIG. 5. An effect created when an image is to be formed in the state illustrated in FIG. 5 using a high-gloss transparent toner in addition to low-gloss four color toners will be described.

When the print server 4 receives image forming information from a client device 2, the CPU 100 executes a program for specifying gloss levels to display a glossiness specifying screen on the UI 108 to allow a user to specify the glossiness or gloss level of the image to be formed in accordance with the image forming information. The user specifies a gloss level in accordance with the glossiness specifying screen. Gloss levels may not necessarily be specified quantitatively but may be specified qualitatively. In this exemplary embodiment, a user may specify the "low gloss" level when the user wishes to set the gloss level to a gloss level that is closer to the gloss levels given by the low-gloss C, M, Y, and K toners after the fixing operation than to the gloss level given by the high-gloss CT toner after the fixing operation. Further, a user may specify the "high gloss" level when the user wishes to set the gloss level to a gloss level that is closer to the gloss level given by the high-gloss CT toner after the fixing operation than to the gloss levels given by the low-gloss C, M, Y, and K toners after the fixing operation. Additionally, a user may specify the "middle gloss" level when the user wishes to set the gloss level to a gloss level that is lower than the "high gloss" level and that is higher than the "low gloss" level. In addition, a user may specify the "no glossy CT" level when the user does not wish to superimpose a high-gloss transparent toner. The print server 4 stores information (glossiness specifying information) indicating the specified gloss level in a predetermined storage area of the RAM 104 or the like, and the gloss level of the image to be formed by the printer 6 is set.

Here, by way of example, the gloss level of the image to be formed is specified by using the print server 4. However, the gloss level of the image to be formed may be specified by using a client device 2 and may be transmitted from the client device 2 to the print server 4 together with image forming information.

The image forming information received by the print server 4 and the glossiness specifying information are input to the image processing unit 106. The process performed from when a glossiness specifying screen is displayed until image forming information and glossiness specifying information are input to the image processing unit 106 may be implemented by the CPU 100 executing a program. Upon receipt of the image forming information and the glossiness specifying information, the image processing unit 106 executes image processing to generate image data corresponding to each toner.

Figure 7:
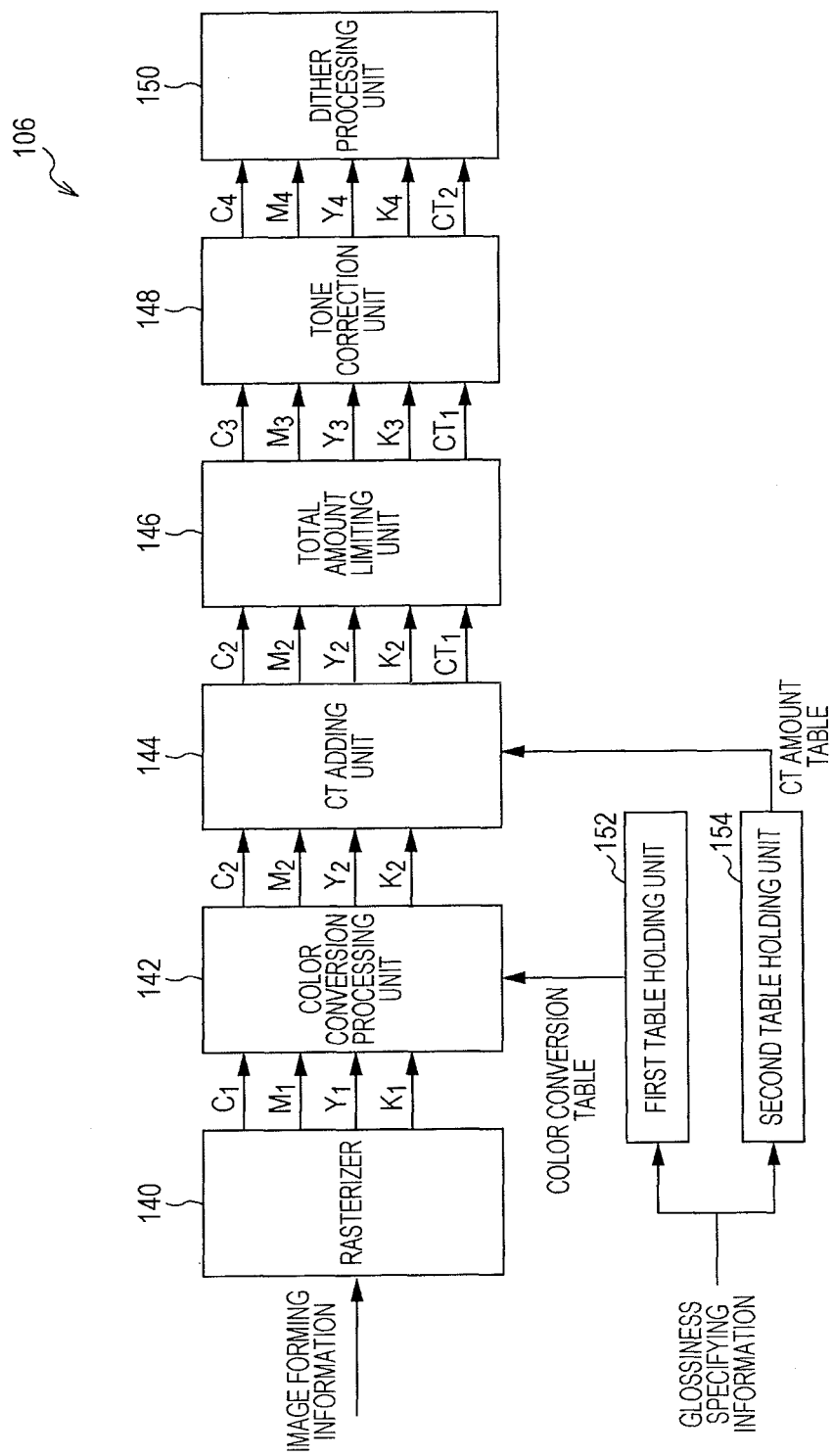
FIG. 7 illustrates an example configuration of an image processing unit.

The configuration of the image processing unit 106 and the image processing performed by the image processing unit 106 will now be described in detail. As illustrated in FIG. 7, the image processing unit 106 includes a rasterizer 140, a color conversion processing unit 142, a CT adding unit 144, a total amount limiting unit 146, a tone correction unit 148, a dither processing unit 150, a first table holding unit 152, and a second table holding unit 154.

The rasterizer 140 performs raster processing in accordance with the input image forming information to generate multi-level bitmap image data (raster data) for each of cyan, magenta, yellow, and black colors. The image data of the respective colors, which is obtained by the rasterizer 140 using the raster processing, may be multi-level image data (hereinafter referred to as "pixel data") indicating the density values of the individual pixels. The rasterizer 140 outputs the generated pixel data to the color conversion processing unit 142. The pixel data of cyan, magenta, yellow, and black output from the rasterizer 140 is represented by $C_1, M_1, Y_1$, and $K_1$, respectively.

In the first table holding unit 152, in accordance with the input glossiness specifying information, the color conversion table (four-input/four-output look-up table DLUT) to be output to the color conversion processing unit 142 is switched to a color conversion table in which parameters are set in accordance with the glossiness specifying information, and the color conversion table is output to the color conversion processing unit 142.

FIGS. 8A to 8D illustrate a specific example of four color conversion tables held in the first table holding unit 152. In the color conversion tables, each value represents a density value of 0% to 100%. FIG. 8A illustrates a color conversion table for the "no glossy CT" level, FIG. 8B illustrates a color conversion table for the "low gloss" level, FIG. 8C illustrates a color conversion table for the "middle gloss" level, and FIG. 8D illustrates a color conversion table for the "high gloss" level. The first table holding unit 152 selects a color conversion table for the gloss level indicated by the glossiness specifying information among the four color conversion tables, and outputs the selected color conversion table to the color conversion processing unit 142.

The above color conversion tables may be tables for correcting density values per pixel of toner images formed using the color toners of the respective CMYK colors so that a total density value that is the sum of the amount of transparent toner (a density value per pixel of the transparent toner image) necessary to set the gloss level of the image to be formed by the printer 6 to the gloss level indicated by the glossiness specifying information and density values per pixel of the toner images to be formed with the color toners of the CMYK colors may not exceed a predetermined total amount limit value.

The total amount limit will now be described.

For example, it may be difficult to stably fix toner onto a sheet of recording paper P if the total amount of toner required to form an image on the sheet of recording paper P exceeds a certain threshold. If the sheet of recording paper P output under this condition and another sheet of recording paper P are discharged in such a manner that the sheets of recording paper P are placed on top of one another, problems may occur such as sticking together of the sheets of recording paper P and color staining caused by transferring toner on one sheet of recording paper P to another sheet of recording paper P. In order to address such problems, in this exemplary embodiment, a process of correcting multi-level image data is performed to control the total amount of toner to be deposited on a sheet of recording paper P. Here, the color conversion processing unit 142 corrects the pixel data of cyan, magenta, yellow, and black so that a total density value that is the sum of density values per pixel (the sum of pixel data values per pixel) of the multi-level image data of the cyan, magenta, yellow, black, and transparent toners may not exceed a predetermined upper limit (hereinafter referred to as a "total limit value" or "total area coverage (TAC)") (if the total density value exceeds the total limit value (TAC), the color conversion processing unit 142 corrects the pixel data of cyan, magenta, yellow, and black so that the sum of the density values for the color toners of the respective colors may be reduced). Further, the color conversion processing unit 142 does not correct the multi-level image data of the transparent toner in accordance with the total amount limit so that an image may be formed with the set gloss level, and forms a transparent toner image with a density value necessary for the target gloss level. In this exemplary embodiment, therefore, image data is generated with total amount limit, in which a high priority is placed on the density values for the transparent toner, so that an image may be formed with the target gloss level (that is, the gloss level indicated by the glossiness specifying information).

The correction operation (total amount limit process) may be performed so that the density values for the cyan, magenta, yellow, and black colors may be reduced by the same ratio. Alternatively, for example, the density values for the YMC colors may be uniformly reduced while the density values for the K color are kept unchanged, or, conversely, the density values for the K color may be reduced while the density values for the YMC colors are kept unchanged.

Furthermore, black and gray may be printed only with black although they may be expressed with a mixture of toners of four colors, i.e., cyan, magenta, yellow, and black. Therefore, the total amount limit process may involve image processing (generally called under color removal (UCR) processing) for replacing three colors, cyan, magenta, and yellow, by black (or uniformly reducing the amounts of CMY toner and increasing the amount of black toner) to keep the sum of the amounts of toner of five colors less than or equal to the total limit value (TAC) with reduced coloring changes. In addition, the total amount limit process may be performed using a look-up table or by performing calculation using a function.

In the color conversion tables illustrated in FIGS. 8A to 8D, density values for the respective color toners before total amount limiting is performed and density values for the respective color toners after total amount limiting is performed in accordance with a target gloss level are set in association with each other.

The color conversion processing unit 142 converts the pixel data $C_1$, $M_1$, $Y_1$, and $K_1$ input from the rasterizer 140 into pixel data $C_2$, $M_2$, $Y_2$, and $K_2$ in accordance with the color conversion table output from the first table holding unit 152, and outputs the pixel data $C_2$, $M_2$, $Y_2$, and $K_2$.

In the second table holding unit 154, in accordance with the input glossiness specifying information, the CT amount table (four-input/five-output look-up table DLUT) to be output to the CT adding unit 144 is switched to a CT amount table in which parameters are set in accordance with the glossiness specifying information, and the resulting CT amount table is output to the CT adding unit 144.

FIGS. 9A to 9D illustrate a specific example of four CT amount tables held in the second table holding unit 154. In the CT amount tables, each value represents a density value of 0% to 100%. FIG. 9A illustrates a CT amount table for the "no glossy CT" level, FIG. 9B illustrates a CT amount table for the "low gloss" level, FIG. 9C illustrates a CT amount table for the "middle gloss" level, and FIG. 9D illustrates a CT amount table for the "high gloss" level. The second table holding unit 154 selects a CT amount table for the gloss level indicated by the glossiness specifying information among the four CT amount tables, and outputs the selected CT amount table to the CT adding unit 144.

The above CT amount tables may be tables for outputting the amount of transparent toner (a density value per pixel of the transparent toner image) necessary to set the gloss level of the image to be formed by the printer 6 to the gloss level indicated by the glossiness specifying information. Therefore, the density values for the respective CMYK colors do not change.

The CT adding unit 144 converts the pixel data $C_2$, $M_2$, $Y_2$, and $K_2$ input from the rasterizer 140 into pixel data $C_2$, $M_2$, $Y_2$, $K_2$, and CT in accordance with the CT amount table output from the second table holding unit 154, and outputs the pixel data $C_2$, $M_2$, $Y_2$, $K_2$, and CT.

The total amount limiting unit 146, which is provided after the CT adding unit 144, checks that the total density value of the pixel data $C_2$, $M_2$, $Y_2$, $K_2$, and CT input from the CT adding unit 144 does not exceed the total limit value (TAC). If the total the density value exceeds the total limit value (TAC), the total amount limiting unit 146 changes the pixel data (density values) of the respective YMCK color toners so that the total density value may become less than or equal to the total limit value (TAC), and outputs the changed pixel data sets.

Specifically, if $C_2+M_2+Y_2+K_2+CT \leq TAC$, the total amount limiting unit 146 outputs the input pixel data without changing them. If $C_2+M_2+Y_2+K_2+CT > TAC$, the total amount limiting unit 146 corrects the density values (pixel data) of the respective color toners to reduce the total value of the density values (pixel data) of the respective color toners, without correcting the density value of the transparent toner (CT), and then outputs the pixel data.

Here, by way of example, the total amount limiting unit 146 checks whether or not the total value is less than or equal to the total limit value (TAC). Since the color conversion processing unit 142 and the CT adding unit 144 perform processing so that the total density value of the respective pieces of pixel data may become less than or equal to the total limit value, the total density value of the respective pieces of pixel data output from the CT adding unit 144 is basically expected to be less than or equal to the total limit value (TAC). Therefore, the total amount limiting unit 146 may be omitted.

Through the processes of the above individual components, as illustrated in FIGS. 10A, 10B, 11A, and 11B, the multi-level pixel data corresponding to each of the toners of four colors, i.e., cyan, magenta, yellow, and black, and the transparent toner, which have been subjected to total amount limit, is generated. Here, the tables illustrated in FIGS. 10A, 10B, 11A, and 11B may be tables representing a specific example of multi-level image data generated by the color conversion processing unit 142, the CT adding unit 144, and the total amount limiting unit 146 in terms of the respective target gloss levels (where, as described above, the total amount limiting unit 146 may be omitted). In the illustrated example, the total limit value (TAC) is defined as a density value of 240%.

Figure 12:
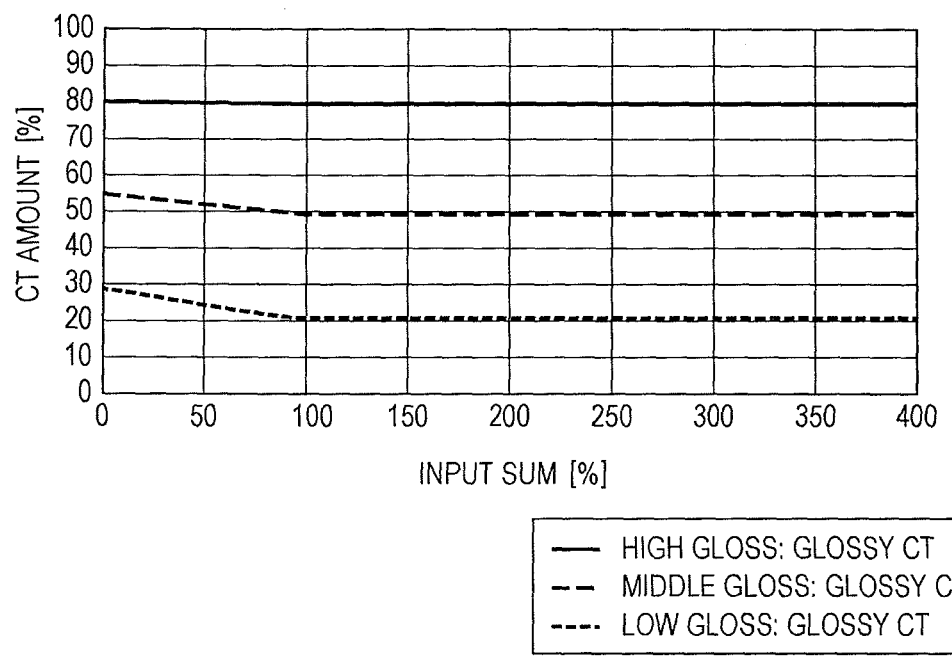
FIG. 12 is a graph illustrating an example of a density value (required CT amount) of a transparent toner, which may be required to form an image with a target gloss level, with respect to the sum of the input density values of the respective YMCK color toners (the sum of pixel data $C_1$, $M_1$, $Y_1$, and $K_1$)

The amount (density value) of transparent toner, which may be required for the target gloss level, may be determined in advance through an experiment or the like. FIG. 12 is a graph illustrating an example of a density value of the transparent toner, which may be required to form an image with a target gloss level (hereinafter referred to as a "required CT amount"), with respect to the input sum of the density values for the respective YMCK color toners (that is, the sum of the pixel data $C_1$, $M_1$, $Y_1$, and $K_1$ in the foregoing description). In the illustrated graph, the abscissa represents the sum of the density values of the color toners, and the ordinate represents the required CT amount. Here, three required CT amounts are illustrated: the required CT amount when the target gloss level is the "high gloss" level, the required CT amount when the target gloss level is the "middle gloss" level, and the required CT amount when the target gloss level is the "low gloss" level. As illustrated in FIG. 12, in this example, the required CT amount when the total density value of the color toners is less than or equal to 100% is slightly greater than the required CT amount when the total density value of the color toners is greater than 100%. The smaller the total density value of the color toners, the lower the gloss level under the condition of no glossy CT. Therefore, here, the required CT amount when the total density value of the color toners is less than or equal to 100% is set greater than that that when the total density value is greater than 100%. The required CT amount may be set as output parameters CT in the CT amount tables illustrated in FIGS. 9A to 9D.

Figure 13:
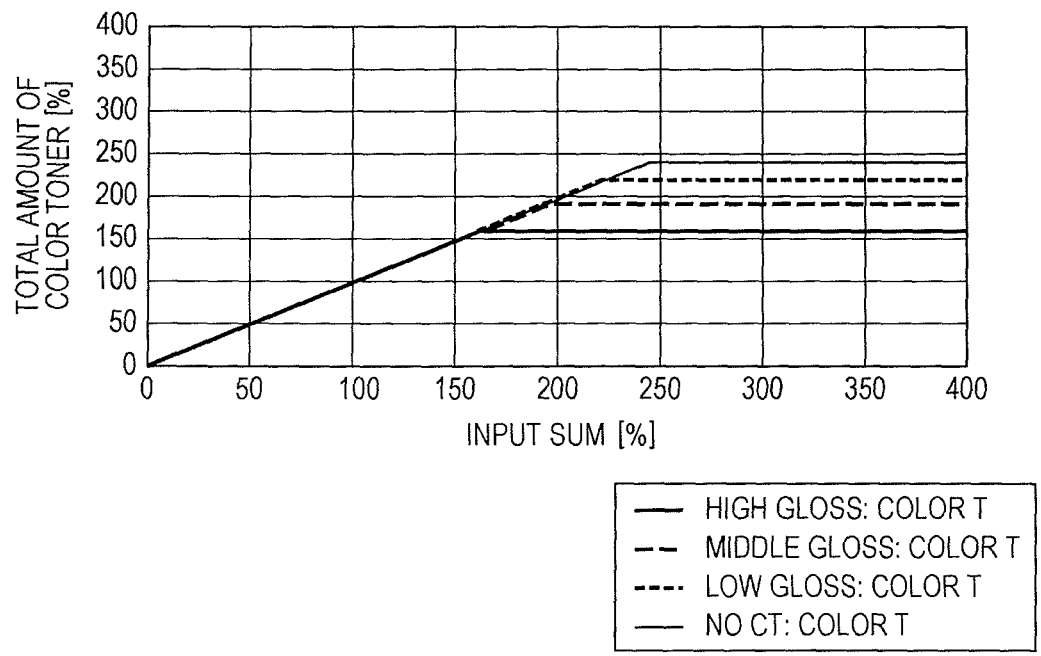
FIG. 13 is a graph illustrating an example of the sum of the density values of color toners (corresponding to the sum of the pixel data $C_2$, $M_2$, $Y_2$, and $K_2$), which have been subjected to total amount limit with the required amount of CT toner taken into account, with respect to the sum of the input density values of the respective YMCK color toners (corresponding to the sum of the pixel data $C_1$, $M_1$, $Y_1$, and $K_1$)

FIG. 13 is a graph illustrating an example of the sum of the density values of the color toners (corresponding to the sum of the pixel data $C_2$, $M_2$, $Y_2$, and $K_2$ in the foregoing description), which have been subjected to total amount limit with the required amount of CT toner taken into account, with respect to the sum of the input density values of the respective YMCK color toners (corresponding to the sum of the pixel data $C_1$, $M_1$, $Y_1$, and $K_1$ in the foregoing description). In the illustrated graph, the abscissa represents the sum of the density values of the color toners before total amount limiting is performed, and the ordinate represents the sum of the density values of the color toners after total amount limiting has been performed. In FIG. 13, four sums are illustrated: the sum of the density values of the color toners after total amount limiting has been performed when the target gloss level is the "high gloss" level, the sum of the density values of the color toners after total amount limiting has been performed when the target gloss level is the "middle gloss" level, the sum of the density values of the color toners after total amount limiting has been performed when the target gloss level is the "low gloss" level, and the sum of the density values of the color toners after total amount limiting has been performed when no high-gloss transparent toner is superimposed. The color conversion tables illustrated in FIGS. 8A to 8D are set so that the input/output relationship may satisfy the graph illustrated in FIG. 13.

Figure 14:
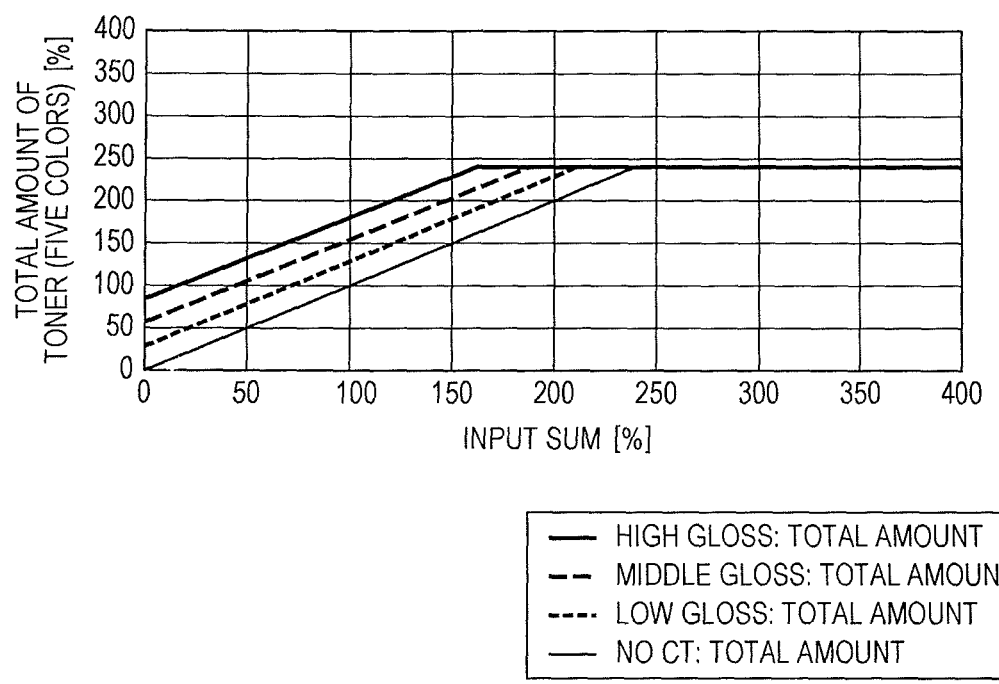
FIG. 14 is a graph illustrating an example of a total density value that is the sum of the required CT amount illustrated in FIG. 12 and the sum of the density values of the color toners after total amount limiting has been performed illustrated in FIG. 13.

FIG. 14 is a graph illustrating an example of a total density value that is the sum of the required CT amount illustrated in FIG. 12 and the sum of the density values of the color toners after total amount limiting has been performed illustrated in FIG. 13. As illustrated in FIG. 14, the total density value of the color toners and the transparent toner is set to be less than or equal to a total limit value of 240%.

The tone correction unit 148, which is provided after the total amount limiting unit 146, converts the pixel data $C_3$, $M_3$, $Y_3$, $K_3$, and CT', which have been subjected to total amount limit processing, into pixel data $C_4$, $M_4$, $Y_4$, $K_4$, and $CT_2$, which have been subjected to tone correction processing, and outputs the pixel data $C_4$, $M_4$, $Y_4$, $K_4$, and $CT_2$. Here, the tone correction unit 148 performs tone correction in accordance with the output characteristics (such as gray balance and non-linear tones) of the image forming device 126 of the printer 6 using a tone correction table (here, a one-input/one-output DLUT) based on the type of the printer 6, the characteristics of the toners, the type of recording paper used for color printing, and any other suitable factors, and outputs the resulting pixel data $C_4$, $M_4$, $Y_4$, $K_4$, and $CT_2$. The tone correction unit 148 may be omitted when tone correction according to the printer 6 is not performed.

The dither processing unit 150, which is provided after the tone correction unit 148, performs dither processing on the pixel data $C_4$, $M_4$, $Y_4$, $K_4$, and $CT_2$ output from the tone correction unit 148 using threshold patterns (hereinafter referred to as "dither matrices") having dither thresholds to binarize the multi-level image data to generate binary image data, and outputs the binary image data. The transparent toner may be subjected to dither processing using a dither matrix with a high screen ruling. Dither processing with a high screen ruling allows a toner layer to be formed in an intensity-modulated manner.

The binary image data of the color toners of the respective colors and the binary image data of the transparent toner, which are output from the dither processing unit 150, are input to the printer 6. The printer 6 forms an image in accordance with the input binary image data.

An image may be formed with a target gloss level by controlling the fixing conditions of the fixing device 60 in addition to the density values of the toners.

The fixing conditions may include at least one of the fixing temperature of the fixing device 60 (the temperature of the heating roller 60B or the temperature of a heating element of the heating roller 60B), the fixing speed (the speed at which recording paper P passes through a fixing position where the fixing device 60 performs the fixing operation), and the width (contact width) of a portion where the pressing roller 60A and the heating roller 60B are in contact with each other in their rotation direction.

As the fixing temperature required for fixing increases, the quantity of heat per unit area with respect to a toner image transferred onto a sheet of recording paper P increases, and the resin contained in the toner is melted to make the surface of the toner image smooth. Further, as the fixing speed is reduced, the time (fixing time) required for fixing increases. Thus, the quantity of heat per unit area with respect to a toner image transferred onto a sheet of recording paper P increases to make the surface of the toner image smooth. Further, as the contact width increases, the fixing time increases. Thus, the quantity of heat per unit area with respect to a toner image transferred onto a sheet of recording paper P increases to make the surface of the toner image smooth. The smoother the surface of the toner image, the higher the gloss level.

Therefore, if the target gloss level indicated by the glossiness specifying information is high, for example, the fixing temperature is controlled to become high. For the transparent toner, the parameters in the CT amount tables in the second table holding unit 154 are set so that a density value per pixel of the transparent toner, which may be required for the target gloss level when the fixing operation is performed at a controlled fixing temperature, may be equal to the pixel data of the transparent toner. For the color toners, the parameters in the color conversion tables in the first table holding unit 152 are set so that the total density value that is the sum of a density value per pixel of the transparent toner, which may be required for the target gloss level when the fixing is performed at a controlled fixing temperature, and density values per pixel of the color toners of the respective colors may not exceed the total limit value (TAC). Similar processing may be performed for a controlled fixing speed or contact width. Controlling not only the density value of the transparent toner but also the fixing conditions may reduce the required amount of transparent toner, and may reduce the amount (correction amount) by which the amount of color toner is to be reduced in the total amount limit process.

Figure 15:
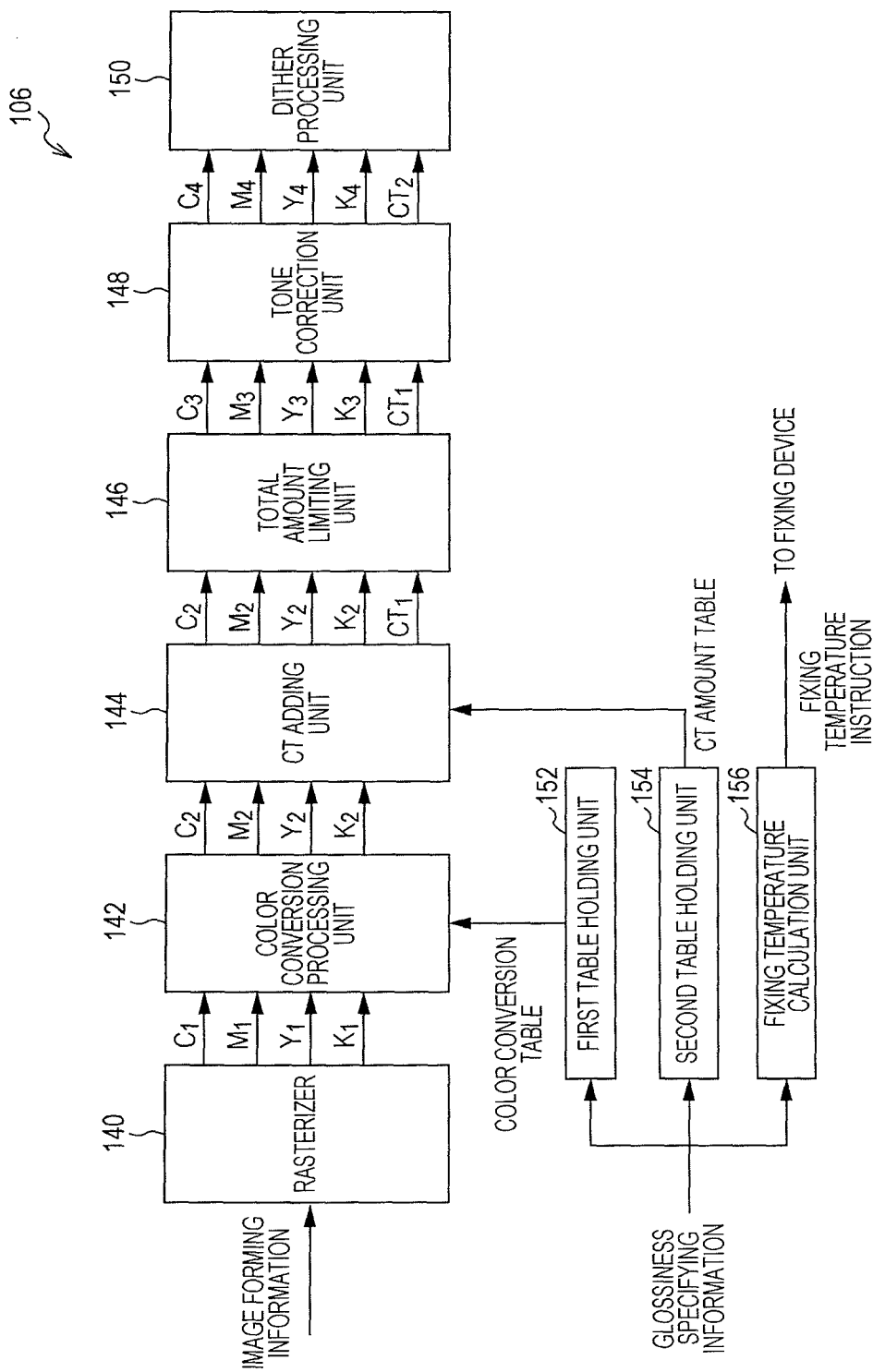
FIG. 15 illustrates another example configuration of the image processing unit.

The fixing conditions may be controlled by using, for example, an image processing unit 106 having a configuration as illustrated in FIG. 15. The image processing unit 106 illustrated in FIG. 15 includes a fixing temperature calculation unit 156 in addition to the configuration of the image processing unit 106 illustrated in FIG. 7. The fixing temperature calculation unit 156 receives an input of glossiness specifying information. The fixing temperature calculation unit 156 controls the fixing temperature in accordance with the input glossiness specifying information so that the gloss level of the image to be formed may become close to the gloss level indicated by the glossiness specifying information. For example, a reference fixing temperature may be determined in advance. The fixing temperature may be controlled to become higher than the reference fixing temperature if the target gloss level is the "high gloss" level, and may be controlled to become lower than the reference fixing temperature if the target gloss level is the "low gloss" level. The reference fixing temperature may be used as it is if the target gloss level is the "middle gloss" level or the "no glossy CT" level. Additionally, the fixing temperature may be calculated using a function, or may be determined from a table in which a target gloss level and a fixing temperature are associated with each other.

Then, a fixing temperature instruction signal is output to the fixing device 60 so that the fixing temperature determined by the fixing temperature calculation unit 156 may be obtained. The fixing device 60 performs the fixing operation at the fixing temperature corresponding to the fixing temperature instruction signal.

Here, by way of example, the image processing unit 106 includes a fixing temperature calculation unit. However, the print server 4 may include a controller that controls a fixing temperature, and control a fixing temperature by using the controller or control a fixing temperature by the CPU 100 of the print server 4 executing a program for controlling a fixing temperature. Furthermore, here, a fixing temperature is controlled by way of example; however, the fixing temperature, the fixing speed, and the contact width may be all controlled or at least one of them may be controlled.

Figure 16:
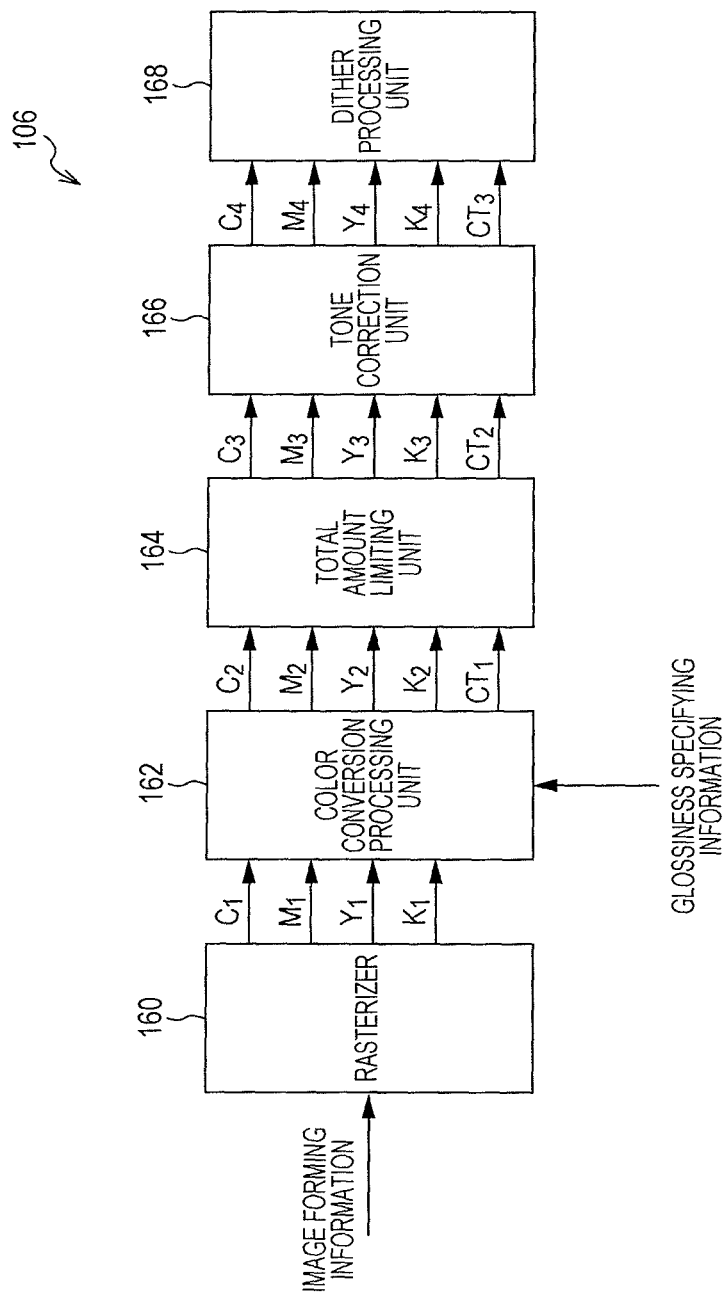
FIG. 16 illustrates another example configuration of the image processing unit.

The image processing unit 106 may also have a configuration illustrated in FIG. 16. In the illustrated example, the image processing unit 106 includes a rasterizer 160, a color conversion processing unit 162, a total amount limiting unit 164, a tone correction unit 166, and a dither processing unit 168.

The rasterizer 160 may operate in a manner similar to that of the rasterizer 140 described above with reference to FIG. 7, and a description thereof is thus omitted.

The color conversion processing unit 162 receives an input of pixel data $C_1$, $M_1$, $Y_1$, and $K_1$ from the rasterizer 160, and also receives an input of glossiness specifying information. In the following description, the glossiness specifying information is represented by any of values "0 (no glossy CT)", "1 (low gloss)", "2 (middle gloss)", and "3 (high gloss)", by way of example.

The color conversion processing unit 162 converts the pixel data $C_1/M_1/Y_1/K_1$ and the glossiness specifying information input from the rasterizer 160 into pixel data $C_2/M_2/Y_2/K_2/CT$ by using a color conversion table (five-input/five-output DLUT) set in advance in the color conversion processing unit 162, and outputs the pixel data $C_2/M_2/Y_2/K_2/CT$.

FIGS. 17A and 17B illustrate a specific example of color conversion tables set in the color conversion processing unit 162. In FIGS. 17A and 17B, values represented by "glossiness mode" correspond to those indicated by the glossiness specifying information described above. In FIGS. 17A and 17B, further, values represented by "total amount" are total density values of the respective toners, which are illustrated for the purpose of explanation and are not included in the color conversion table used by the color conversion processing unit 162. The parameters CT, which are set in the color conversion tables to be output, may be density values of the transparent toner required to implement the target gloss levels, and the density values of the color toners of the respective YCMK colors, which are set in the color conversion tables to be output, have been subjected to total amount limit and have been set so that the total density value of the respective toners may become less than or equal to a total limit value of 240%. The conversion based on the color conversion tables described above allows the processes of the color conversion processing unit 142 and the CT adding unit 144 described above with reference to FIG. 7 to be collectively performed.

The total amount limiting unit 164, which is provided after the color conversion processing unit 162, checks that the total density value of the pixel data $C_2$, $M_2$, $Y_2$, $K_2$, and CT input from the color conversion processing unit 162 does not exceed the total limit value (TAC). If the total density value exceeds the total limit value (TAC), the total amount limiting unit 164 changes the pixel data (density values) of the color toners of the respective YMCK colors so that the total density value may become less than or equal to the total limit value (TAC), and outputs the changed pixel data.

Here, by way of example, the total amount limiting unit 164 checks whether or not the total density value is less than or equal to the total limit value (TAC). Since the color conversion processing unit 162 performs processing so that the total density value of the respective pixel data may become less than or equal to the total limit value, the total density value of the respective pixel data output from the color conversion processing unit 162 is basically expected to be less than or equal to the total limit value (TAC). Therefore, the total amount limiting unit 164 may be omitted.

The tone correction unit 166, which is provided after the total amount limiting unit 164, converts the pixel data $C_3$, $M_3$, $Y_3$, $K_3$, and $CT_1$, which have been subjected to total amount limit processing, into pixel data $C_4$, $M_4$, $Y_4$, $K_4$, and $CT_2$, which have undergone tone correction processing, and outputs the pixel data $C_4$, $M_4$, $Y_4$, $K_4$, and $CT_2$. Here, similarly to the tone correction unit 148, the tone correction unit 166 performs tone correction in accordance with the output characteristics (such as gray balance and non-linear tones) of the image forming device 126 of the printer 6 using a tone correction table (here, a one-input/one-output DLUT) based on the type of the printer 6, the characteristics of the toners, the type of recording paper used for color printing, and any other suitable factors, and outputs the resulting pixel data $C_4$, $M_4$, $Y_4$, $K_4$, and $CT_2$. The tone correction unit 166 may be omitted when tone correction according to the printer 6 is not performed.

The dither processing unit 168, which is provided after the tone correction unit 166, performs dither processing on the pixel data $C_4$, $M_4$, $Y_4$, $K_4$, and $CT_2$ output from the tone correction unit 166 using dither matrices to binarize the multi-level image data to generate binary image data, and outputs the binary image data. The binary image data of the color toners of the respective colors and the binary image data of the transparent toner, which are output from the dither processing unit 168, are input to the printer 6. The printer 6 forms an image in accordance with the input binary image data.

Figure 18:
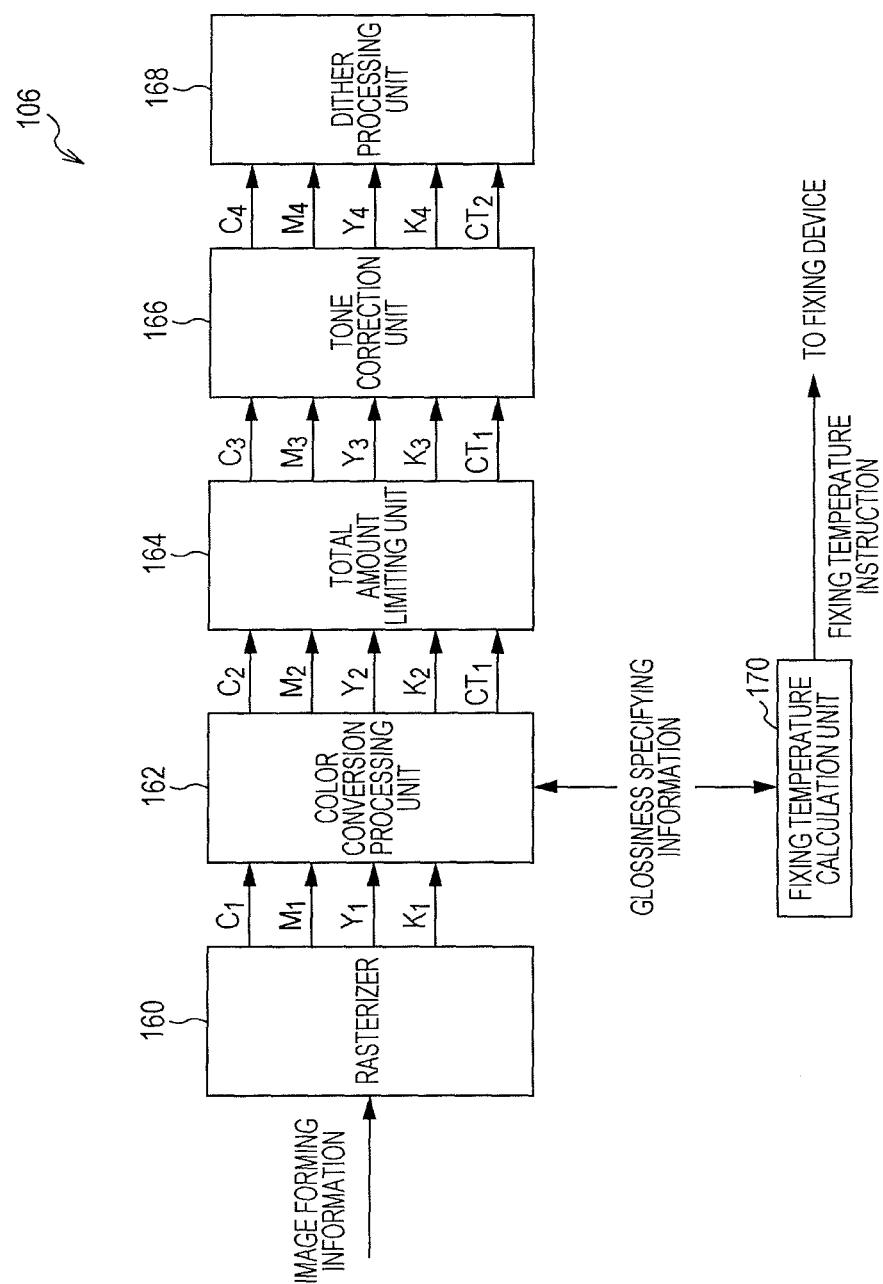
FIG. 18 illustrates another example configuration of the image processing unit.

In this example, similarly to the example described above, an image may be formed with a target gloss level by controlling the fixing conditions of the fixing device 60 in addition to the density values of the toners. An image processing unit 106 illustrated in FIG. 18 includes a fixing temperature calculation unit 170 in addition to the configuration of the image processing unit 106 illustrated in FIG. 16. The operation of the fixing temperature calculation unit 170 may be similar to that of the fixing temperature calculation unit 156 described with reference to FIG. 15, and a description thereof is thus omitted.

Alternatively, an image may be formed by dividing the image to be formed into plural areas, setting a gloss level for each of the areas, and generating image data so that each of the plural areas may have the corresponding one of the set gloss levels. Examples of the operation of setting a gloss level for each of plural areas may include setting a gloss level for each object included in the image to be formed. An object may be an image of a small area having predetermined attributes. Examples of the predetermined attributes include characters (a character block rather than a single character), a picture, a graph, a ruled line, a table (a character set having matrix elements in an area surrounded by ruled lines), and each cell of a table (each of rows that together form a table), and image data is divided by each of the predetermined attributes. The operation of dividing image data into sections on an object-by-object basis in the manner described above is referred to as "extraction of objects". Even images having the same attributes, but which are not adjacent but are spaced apart from each other, may be extracted as different objects.

Figure 19:
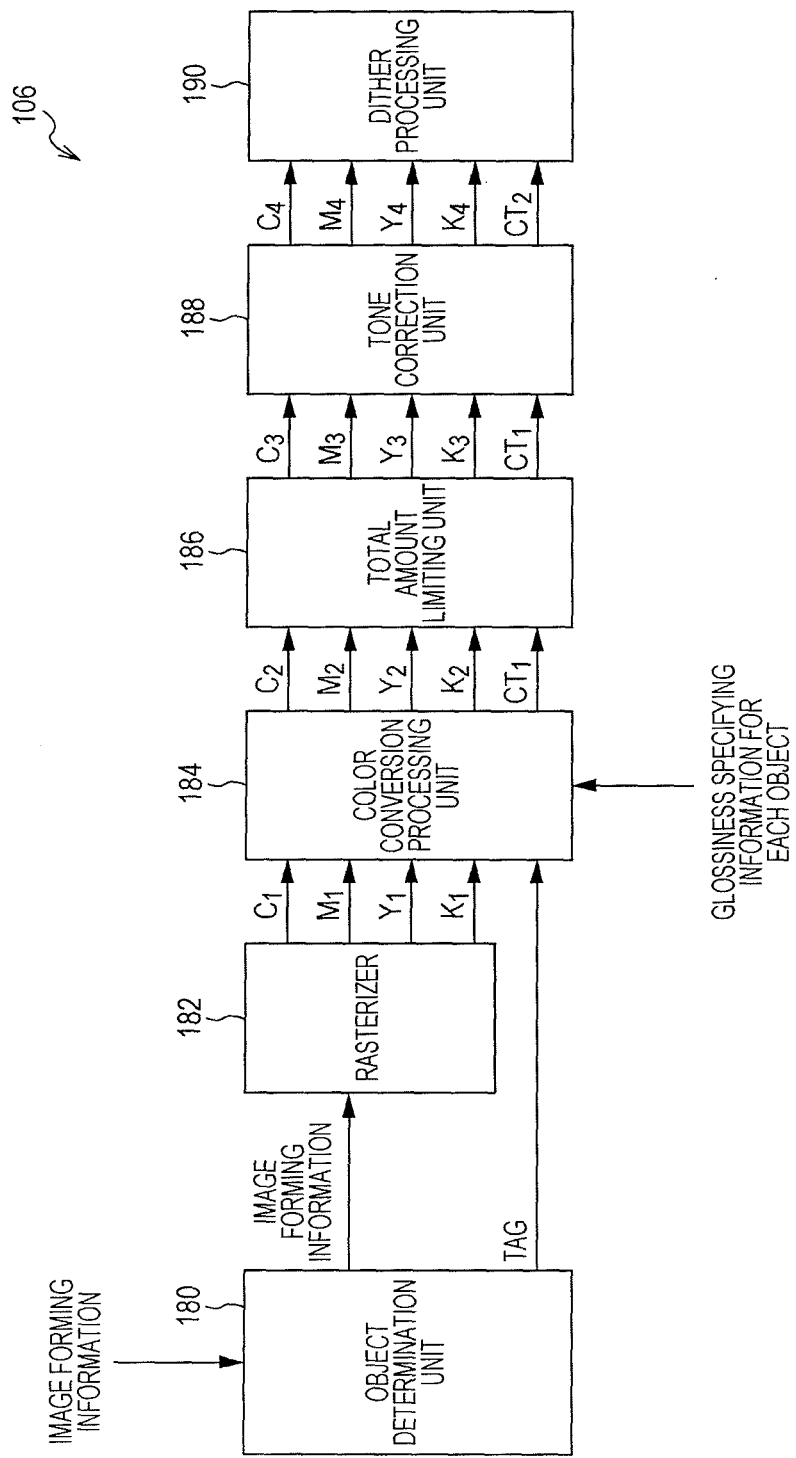
FIG. 19 illustrates another example configuration of the image processing unit.

FIG. 19 illustrates an image processing unit 106 including an object determination unit in addition to the configuration described with reference to FIG. 16. An example of forming an image by setting a gloss level for each object will be described with reference to FIG. 19.

The print server 4 analyzes received image forming information, and extracts an object of an image to be formed in accordance with the image forming information. Then, a glossiness specifying screen for specifying the gloss level of each object is displayed on a display unit of the UI 108 to allow a user to specify the gloss level of each object. The specified gloss levels are stored in the RAM 104 in association with identification information identifying the respective objects. Here, by way of example, the gloss level of each object is specified using the print server 4. However, the gloss level of each object may be specified using a client device 2 and may be transmitted together with the image forming information from the client device 2 to the print server 4.

The image forming information and the glossiness specifying information received by the print server 4 are input to the image processing unit 106 illustrated in FIG. 19. The image processing unit 106 executes image processing to generate image data corresponding to each toner.

The image processing unit 106 illustrated in FIG. 19 includes an object determination unit 180, a rasterizer 182, a color conversion processing unit 184, a total amount limiting unit 186, a tone correction unit 188, and a dither processing unit 190.

Upon receipt of an input of image forming information, the object determination unit 180 sets a tag indicating identification information identifying each object included in an image indicated by the image forming information, and outputs the tags to the color conversion processing unit 184. The image forming information is output to the rasterizer 182.

The rasterizer 182 performs raster processing in accordance with the input image forming information to generate multi-level bitmap image data (raster data) for each of cyan, magenta, yellow, and black colors. The image data for each color, which is obtained by the rasterizer 182 using the raster processing, may be composed of multi-level image data (pixel data) indicating the density values of the individual pixels. The rasterizer 182 outputs the multi-level image data to the color conversion processing unit 142 collectively on an object-by-object basis.

The color conversion processing unit 184 converts the multi-level image data on an object-by-object basis using the five-input/five-output DLUT illustrated in FIGS. 17A and 17B in accordance with the tags input from the object determination unit 180 and in accordance with glossiness specifying information for specifying a gloss level for each object, and outputs pixel data indicating the density values of the color toners of the respective CMYK colors and the density value of the transparent toner.

The operation of the total amount limiting unit 186, the tone correction unit 188, and the dither processing unit 190 may be similar to that of the total amount limiting unit 164, the tone correction unit 166, and the dither processing unit 168 described with reference to FIG. 16, respectively, and descriptions thereof are thus omitted.

Figure 20:
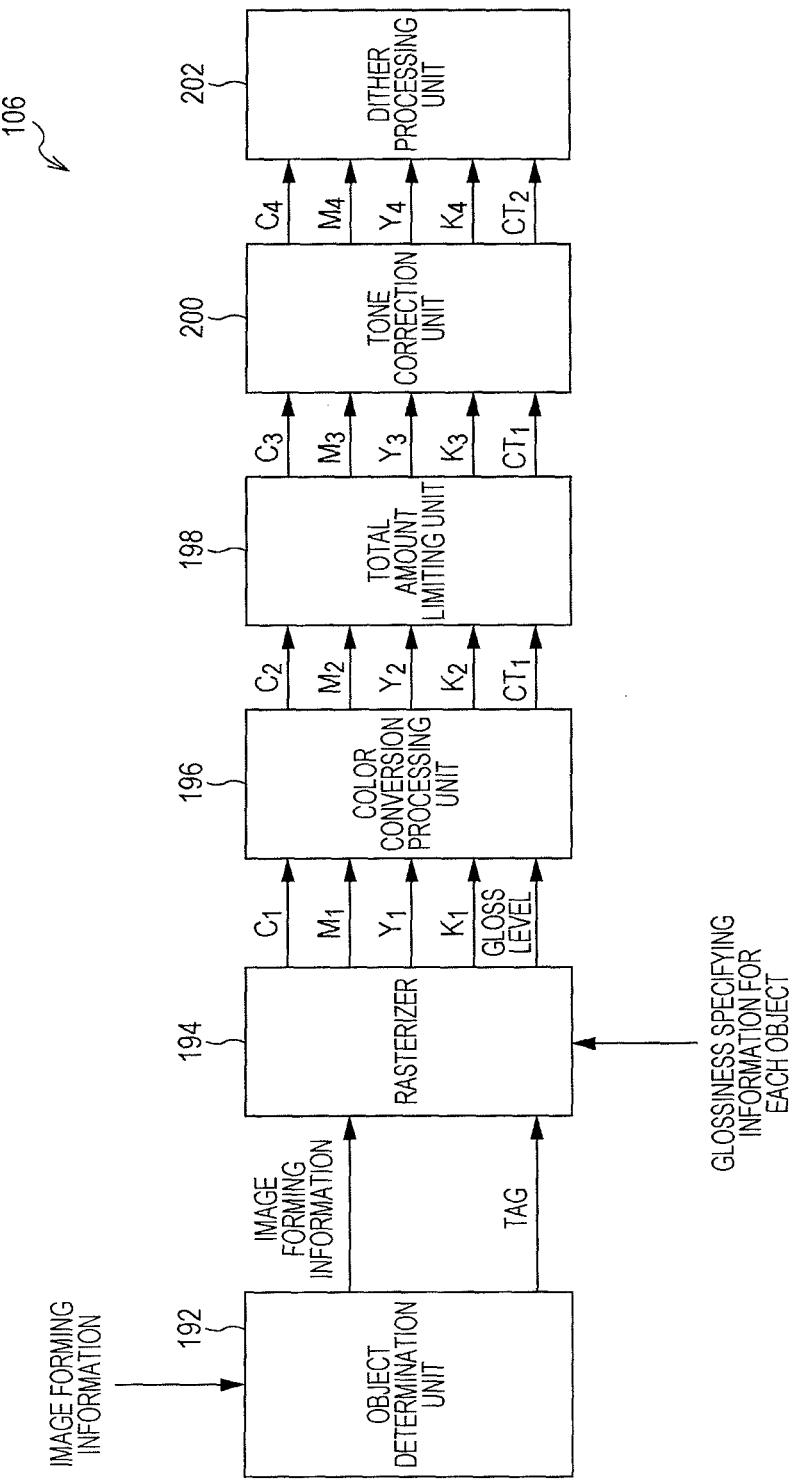
FIG. 20 illustrates another example configuration of the image processing unit.

The image processing unit 106 may also have a configuration illustrated in FIG. 20. The image processing unit 106 illustrated in FIG. 20 includes an object determination unit 192, a rasterizer 194, a color conversion processing unit 196, a total amount limiting unit 198, a tone correction unit 200, and a dither processing unit 202.

Upon receipt of an input of image forming information, the object determination unit 192 sets a tag indicating identification information identifying each object included in an image indicated by the image forming information, and outputs the tags to the rasterizer 194 together with the image forming information.

The rasterizer 194 receives the image forming information and the tags input from the object determination unit 192, and also receives glossiness specifying information about the objects set in the manner described above. The rasterizer 194 performs raster processing in accordance with the received image forming information to generate multi-level bitmap image data (raster data) for each of cyan, magenta, yellow, and black colors. The rasterizer 194 also outputs the generated multi-level image data and a target gloss level for each object (in this exemplary embodiment, a value indicating one of the "no glossy CT", "low gloss", "middle gloss", and "high gloss" levels), which is set in accordance with the tags and the glossiness specifying information.

The color conversion processing unit 196 converts the input multi-level image data on an object-by-object basis using the five-input/five-output DLUT illustrated in FIGS. 17A and 17B in accordance with the input gloss levels, and outputs pixel data indicating the density values of the color toners of the respective CMYK colors and the density value of the transparent toner.

The operation of the total amount limiting unit 198, the tone correction unit 200, and the dither processing unit 202 may be similar to that of the total amount limiting unit 164, the tone correction unit 166, and the dither processing unit 168 described with reference to FIG. 16, respectively, and descriptions thereof are thus omitted.

In the exemplary embodiment and modifications described above, the image processing unit 106 is implemented by hardware and executes image processing, by way of example. Alternatively, the image processing may be performed by software that executes the functions of the image processing unit 106.

Figure 21:
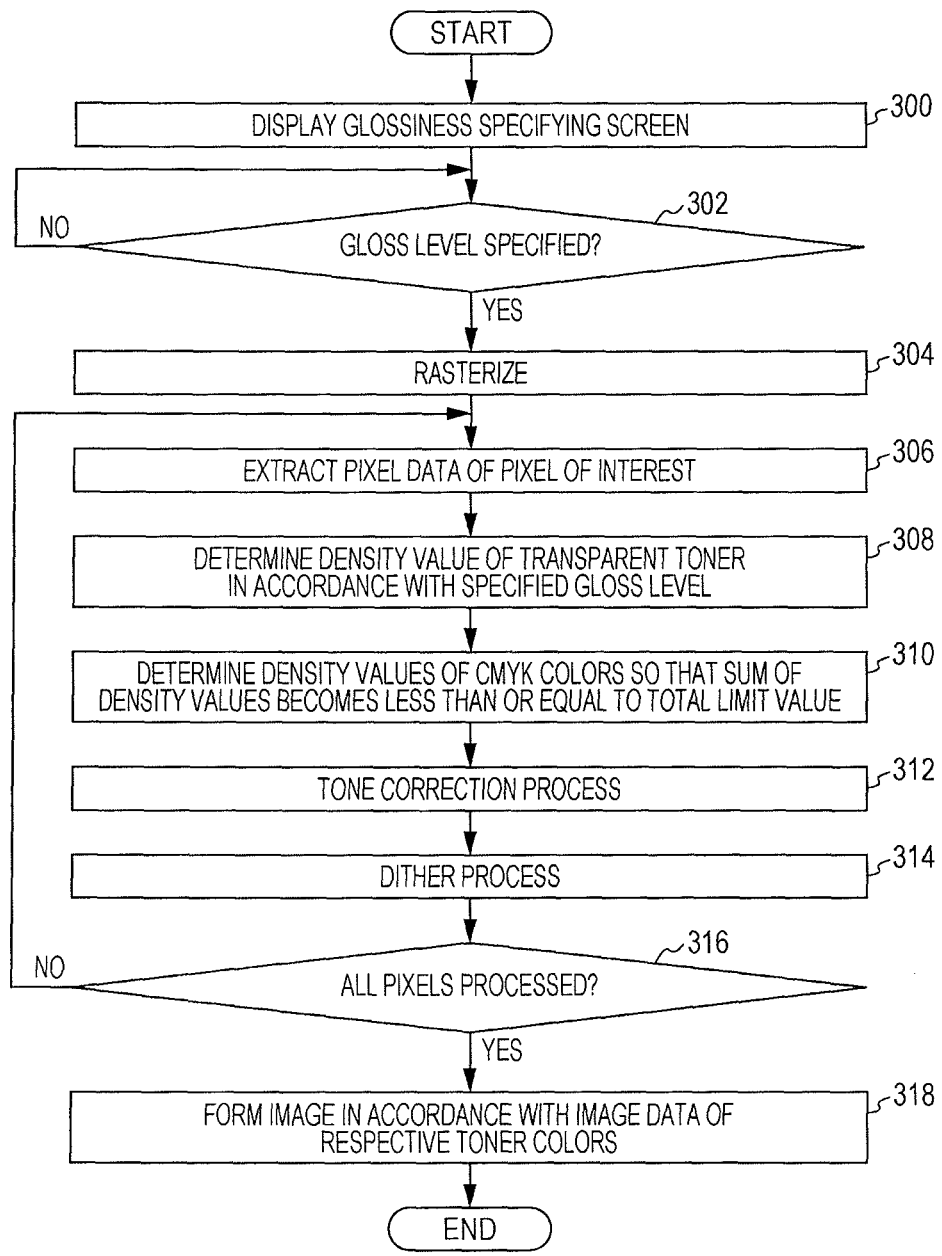
FIG. 21 is a flowchart illustrating a flow of the processing routine for image processing similar to that executed by the image processing unit illustrated in FIG. 16.

FIG. 21 is a flowchart illustrating a flow of the processing routine for image processing similar to that executed by the image processing unit 106 illustrated in FIG. 16. A program for performing the processing routine is stored in a storage unit such as the HDD 110 or the ROM 102, and is executed by the CPU 100. Here, the functions of the image processing unit 106 illustrated in FIG. 16 are executed by software, by way of example. However, also when the functions of the image processing unit 106 illustrated in FIGS. 7, 15, 18, 19, and 20 are executed by software in a similar manner, the steps (not illustrated) corresponding to the processes of the individual components may be included.

In step 300, a glossiness specifying screen is displayed and the process waits until a user enters a specified gloss level in step 302. If a gloss level is specified in step 302, the process proceeds to step 304. The processing of steps 300 and 302 may be the same or substantially the same as processing performed before image forming information and glossiness specifying information are input to the image processing unit 106, as described in the foregoing exemplary embodiment.

In step 304, rasterization is performed in accordance with the image forming information. This processing corresponds to the function implemented by the rasterizer 160 in FIG. 16.

In step 306, pixel data of a pixel of interest is extracted. In step 308, a density value (per pixel) of a transparent toner image necessary to form an image with the specified gloss level is determined for the pixel of interest. In step 310, density values per pixel of the toner images of the color toners are determined for the pixel of interest so that the total density value that is the sum of the density values of the color toners and the density value of the transparent toner may become less than or equal to a total limit value (TAC). The processing of steps 306 and 308 corresponds to the processing performed by the color conversion processing unit 162 in FIG. 16.

In step 312, a tone correction process is performed. In step 314, a dither process is performed. The tone correction process and the dither process correspond to the processes of the tone correction unit 166 and the dither processing unit 168 in FIG. 16, respectively.

In step 316, it is determined whether or not the image processing has been completed for all the pieces of pixel data. If a negative determination is made, the process returns to step 306, and the subsequent pixel data is extracted as pixel data of the pixel of interest. Then, the process is repeatedly performed in a manner similar to that described above. If an affirmative determination is made in step 316, the process proceeds to step 318.

In step 318, the image data generated by performing the image processing described above so that an image may be formed in accordance with the image data for each toner is output to a printer 6.

Figure 22:
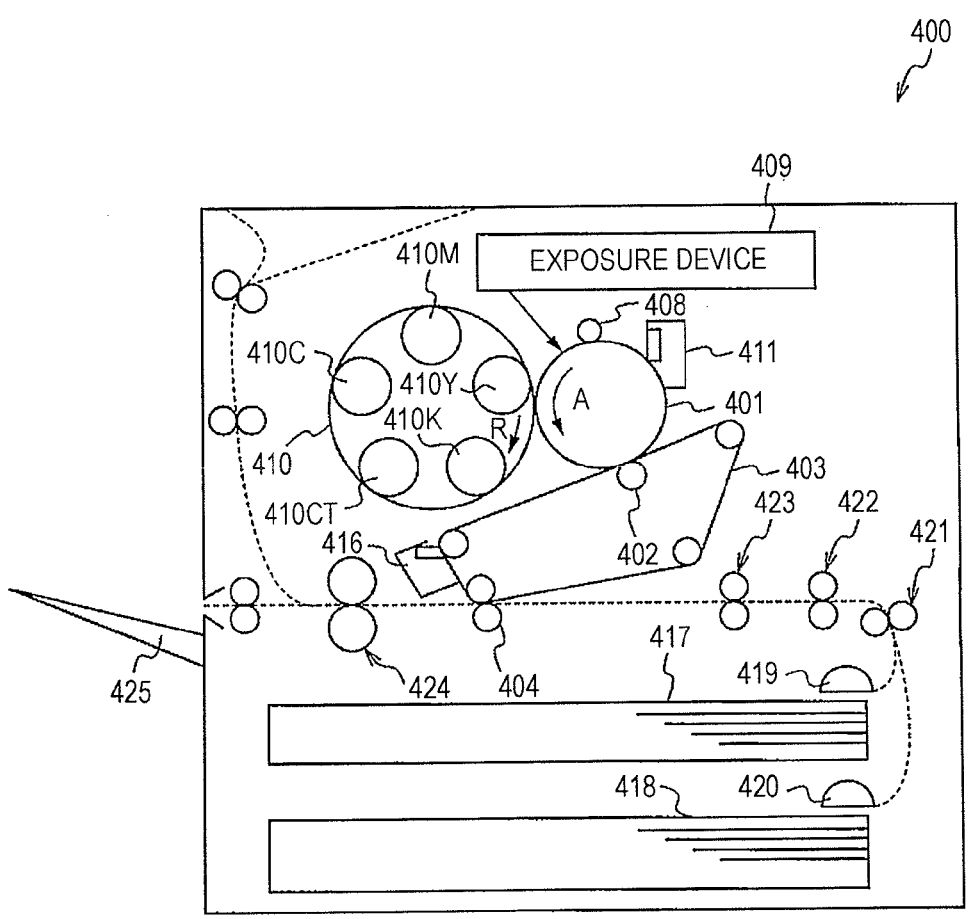
FIG. 22 illustrates another example configuration of the image forming device.

In the exemplary embodiment described above, the image forming device 126 which is a tandem image forming device configured such that the plural image forming units 18 are arranged in the process direction has been described, by way of example. However, a tandem image forming device is merely an example, and, for example, as illustrated in FIG. 22, an image forming device 400 including a rotary developing device 410 may be used.

A photoconductor 401 is provided so as to rotate in the direction indicated by the arrow A by using a motor (not illustrated). A charging roller 408, an exposure device 409, the developing device 410, a first transfer device 402, and a cleaning device 411 are arranged around the photoconductor 401.

The charging roller 408 charges the surface of the photoconductor 401. The exposure device 409 exposes the charged surface of the photoconductor 401 to a laser beam in accordance with image data to form an electrostatic latent image.

The developing device 410 includes developing units 410Y, 410M, 410C, 410K, and 410CT arranged along the circumferential direction thereof. The developing units 410Y, 410M, 410C, and 410K use low-gloss toners of Y, M, C, and K colors, respectively, and the developing unit 410CT uses a high-gloss transparent toner. The developing units 410Y, 410M, 410C, 410K, and 410CT develop electrostatic latent images on the photoconductor 401 using the low-gloss toners of C, M, Y, and K colors and the high-gloss transparent toner, respectively. To develop an electrostatic latent image, the developing device 410 is driven to rotate in the direction indicated by the arrow R by using a motor (not illustrated), and is positioned so that a corresponding one of the developing units 410Y, 410M, 410C, 410K, and 410CT may face the latent image on the photoconductor 401.

Toner images developed on the photoconductor 401 are sequentially transferred onto an intermediate transfer belt 403 by the first transfer device 402 so that the respective toner images may be superimposed on top of one another. The intermediate transfer belt 403 has a belt cleaning unit 416, and a cleaning blade of the belt cleaning unit 416 scrapes residual toner off the intermediate transfer belt 403.

A sheet of recording paper fed to a transport path by one of extraction rollers 419 and 420 from a corresponding one of recording paper cassettes 417 and 418 is transported to a transfer position of a second transfer device 404 by roller pairs 421, 422, and 423. The toner images formed on the intermediate transfer belt 403 are transferred onto the sheet of recording paper at the transfer position, and are fixed under heat by a fixing device 424. The sheet of recording paper is output to an output unit 425 or onto the top surface of the main body of the image forming device 400.

The image forming device 400 may also be used as an image forming device that forms an image, as described in the exemplary embodiment described above.

When an image is to be formed using a transparent toner by using the image forming device 400, a control instruction is transmitted from the print server 4 to the printer 6 to control the image forming device 400 to form an image in printing order so that a transparent toner image may be transferred onto the top layer with respect to the recording surface of recording paper.

The foregoing exemplary embodiment has been described in the context of a printer configured to form an image on a recording medium using an intermediate transfer belt, by way of example. A printer configured to transfer a toner image directly onto a recording medium from a photoconductor may also be used.

Furthermore, the foregoing exemplary embodiment has been described in the context of the printer 6 that forms an image using low-gloss CMYK toners and a high-gloss transparent toner, by way of example. However, the printer 6 is merely an example, and a printer configured to form an image using high-gloss CMYK toners and a low-gloss transparent toner may also be used. Even with this configuration, as described in the exemplary embodiment and modifications described above, image data for defining density values per pixel of toner images formed using color toners of the respective CMYK colors is corrected so that a total density value that is the sum of a density value per pixel of a transparent toner image necessary to form an image with a set gloss level and density values per pixel of toner images formed using the color toners of the respective CMYK colors may not exceed the total limit value (TAC).

Furthermore, the foregoing exemplary embodiment has been described in the context of the printer 6 that forms an image using color toners of the respective CMYK colors, by way of example. Alternatively, a printer configured to form an image using orange, green, and blue (OGB) toners or red, green, and blue (RGB) toners instead of using CMY toners may also be used, and the colors of color toners used to form an image are not particularly limited.

Moreover, multi-level image data for each of the CMYK colors is generated during rasterization. Alternatively, multi-level image data for each of RGB colors or multi-level image data for colors in Lab may be generated. The generated multi-level RGB image data or the like may be converted into multi-level image data for the respective CMYK colors in accordance with a general conversion rule, thereby generating image data for forming an image using color toners of the respective CMYK colors.

In the foregoing exemplary embodiment, furthermore, a dither process is also performed by the print server 4, by way of example. However, a dither process may be performed on the printer 6 side. Additionally, for example, the print server 4 and the printer 6 may be integrally formed. In other words, the printer 6 may have the functions of the image processing unit 106 of the print server 4, and the printer 6 may receive image forming information directly from a client device 2 and perform the image processing described above to generate image data for the respective toners, thereby forming an image.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    a setting unit configured to set a gloss level of an image to be formed by forming a plurality of toner images using a transparent toner and a plurality of color toners having different colors and by fixing the plurality of toner images onto a recording medium in such a manner that the plurality of toner images are placed on top of one another on the recording medium, the plurality of color toners giving a first gloss level after the plurality of toner images have been fixed, the transparent toner becoming transparent and giving a second gloss level different from the first gloss level after the plurality of toner images have been fixed; and
    a correcting unit configured to correct image data defining density values per pixel of the toner images formed using the plurality of color toners of the respective colors so that a total density value may not exceed a predetermined threshold,
    wherein the total density value is a sum of (i) a density value per pixel of the toner image formed using the transparent toner, which is used for setting the gloss level of the image to be formed to the set gloss level, and (ii) density values per pixel of the toner images formed using the plurality of color toners of the respective colors.

2. The image processing apparatus of claim 1, wherein the correcting unit is configured to correct the image data by refraining from correcting image data defining the density value per pixel of the toner image formed using the transparent toner while maintaining the total density value below the predetermined threshold.

3. The image processing apparatus according to claim 1, further comprising:
    a controller configured to control a fixing condition under which the toner images formed using the plurality of color toners are fixed so that the gloss level of the image to be formed may be close to the set gloss level,
    wherein the correcting unit is configured to correct the image data defining density values per pixel of the toner images formed using the plurality of color toners of the respective colors so that the total density value that is the sum of the density value per pixel of the toner image formed using the transparent toner, which is necessary to set the gloss level of the image to be formed to the set gloss level when the image to be formed is fixed under the fixing condition controlled by the controller, and the density values per pixel of the toner images formed using the plurality of color toners of the respective colors may not exceed the predetermined threshold.

4. An image forming apparatus comprising:
    an image forming unit configured to form an image by forming a plurality of toner images using a transparent toner and a plurality of color toners having different colors and by fixing the plurality of toner images onto a recording medium in such a manner that the plurality of toner images are placed on top of one another on the recording medium, the plurality of color toners giving a first gloss level after the plurality of toner images have been fixed, the transparent toner becoming transparent and giving a second gloss level different from the first gloss level after the plurality of toner images have been fixed;
    a setting unit configured to set a gloss level of the image to be formed by the image forming unit; and
    a correcting unit configured to correct image data defining density values per pixel of the toner images formed using the plurality of color toners of the respective colors so that a total density value may not exceed a predetermined threshold,
    wherein the total density value is a sum of (i) a density value per pixel of the toner image formed using the transparent toner, which is used for setting the gloss level of the image to be formed to the set gloss level, and (ii) density values per pixel of the toner images formed using the plurality of color toners of the respective colors.

5. The image forming apparatus of claim 4, wherein the correcting unit is configured to correct the image data by refraining from correcting image data defining the density value per pixel of the toner image formed using the transparent toner while maintaining the total density value below the predetermined threshold.

6. A non-transitory computer readable medium storing a program causing a computer to execute a process, the process comprising:

setting a gloss level of an image to be formed by forming a plurality of toner images using a transparent toner and a plurality of color toners having different colors and by fixing the plurality of toner images onto a recording medium in such a manner that the plurality of toner images are placed on top of one another on the recording medium, the plurality of color toners giving a first gloss level after the plurality of toner images have been fixed, the transparent toner becoming transparent and giving a second gloss level different from the first gloss level after the plurality of toner images have been fixed; and correcting image data defining density values per pixel of the toner images formed using the plurality of color toners of the respective colors so that a total density value may not exceed a predetermined threshold, wherein the total density value is a sum of a density value per pixel of the toner image formed using the transparent toner, which is used for setting the gloss level of the image to be formed to the set gloss level, and density values per pixel of he toner images formed using the plurality of color toners of the respective colors.

7. The non-transitory computer readable medium of claim 6, wherein the correcting image data comprises refraining from correcting image data defining the density value per pixel of the toner image formed using the transparent toner while maintaining the total density value below the predetermined threshold.

8. A non-transitory computer readable medium storing a program causing a computer to execute a process, the process comprising:

setting a gloss level of each of a plurality of areas into which an image to be formed is divided, the image to be formed being an image to be formed by forming a plurality of toner images using a transparent toner and a plurality of color toners having different colors and by fixing the plurality of toner images onto a recording medium in such a manner that the plurality of toner images are placed on top of one another on the recording medium, the plurality of color toners giving a first gloss level after the plurality of toner images have been fixed, the transparent toner becoming transparent and giving a second gloss level different from the first gloss level after the plurality of toner images have been fixed; and correcting image data defining density values per pixel of the toner images formed using the plurality of color toners of the respective colors so that a total density value may not exceed a predetermined threshold, wherein the total density value is a sung of (i) a density value per pixel of the toner image formed using the transparent toner, which is used for setting ach of the gloss levels of the plurality of areas to a corresponding one of the set gloss levels, and (ii) density values per pixel of the toner images formed using the plurality of color toners of the respective colors.

9. The non-transitory computer readable medium of claim 8, wherein the correcting image data comprises refraining from correcting image data defining the density value per pixel of the toner image formed using the transparent toner while maintaining the total density value below the predetermined threshold.

10. An image processing apparatus comprising:

a setting unit that configured to set a gloss level of each of a plurality of areas into which an image to be formed is divided, the image to be formed being an image to be formed by forming a plurality of toner images using a transparent toner and a plurality of color toners having different colors and by fixing the plurality of toner images onto a recording medium in such a manner that the plurality of toner images are placed on top of one another on the recording medium, the plurality of color toners giving a first gloss level after the plurality of toner images have been fixed, the transparent toner becoming transparent and giving a second gloss level different from the first gloss level after the plurality of toner images have been fixed; and a correcting unit configured to correct image data defining density values per pixel of the toner images formed using the plurality of color toners of the respective colors so that a total density value may not exceed a predetermined threshold, wherein the total density value is a sum of (i) a density value per pixel of the toner image formed using the transparent toner, which is used for setting each of the gloss levels of the plurality of areas to a corresponding one of the set gloss levels, and (ii) density values per pixel of the toner images formed using the plurality of color toners of the respective colors.

11. The image processing apparatus of claim 10, wherein the correcting unit is configured to correct the image data by refraining from correcting image data defining the density value per pixel of the toner image formed using the transparent toner while maintaining the total density value below the predetermined threshold.

12. An image forming apparatus comprising:

an image forming unit configured to form an image by forming a plurality of toner images using a transparent toner and a plurality of color toners having different colors and by fixing the plurality of toner images onto a recording medium in such a manner that the plurality of toner images are placed on top of one another on the recording medium, the plurality of color toners giving a first gloss level after the plurality of toner images have been fixed, the transparent toner becoming transparent and giving a second gloss level different from the first gloss level after the plurality of toner images have been fixed;

a setting unit configured to set a gloss level of each of a plurality of areas into which the image to be formed by the image forming unit is divided; and a correcting unit configured to correct image data defining density values per pixel of the toner images formed using the plurality of color toners of the respective colors so that a total density value may not exceed a predetermined threshold, wherein the total density value is a sub of (i) a density value per pixel of the toner image formed using the transparent toner, which is used for setting each of the gloss levels of the plurality of areas to a corresponding one of the set gloss levels, and (ii) density values per pixel of the toner images formed using the plurality of color toners of the respective colors.

13. The image forming apparatus of claim 12, wherein the correcting unit is configured to correct the image data by refraining from correcting image data defining the density value per pixel of the toner image formed using the transparent toner while maintaining the total density value below the predetermined threshold.

14. An image processing apparatus for correcting pixel data of an image formed using color toners and a transparent toner, the image processing apparatus comprising:

one or more processors configured to:

correct color pixel data of an image so that a sum of density values for the color toners is reduced without correcting transparent pixel data representing density values of the transparent toner, in order to form the image with a specified gloss level.

* * * * *